Aug. 18, 1964   R. H. BENNER 2ND., ETAL   3,145,374
HIGH-SPEED MEASURING SYSTEM
Filed Oct. 17, 1958   8 Sheets-Sheet 1

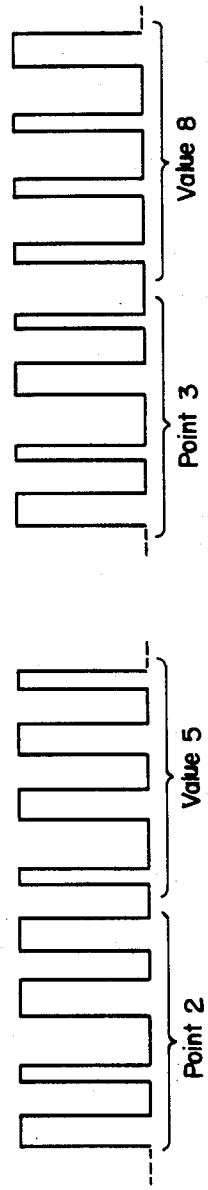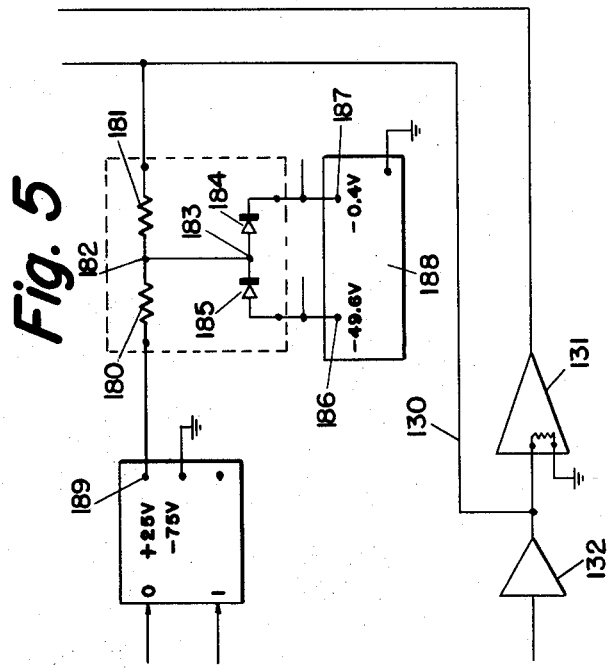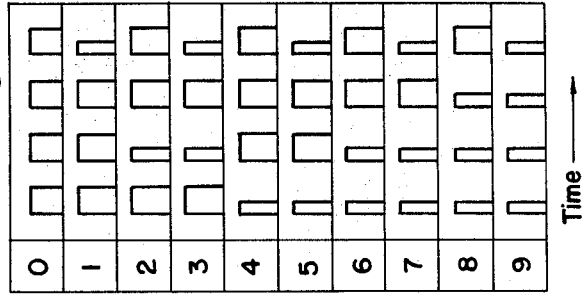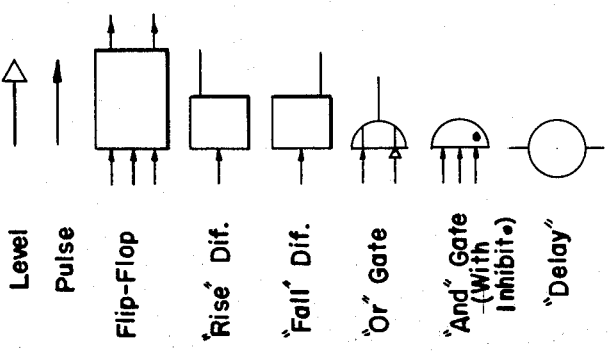

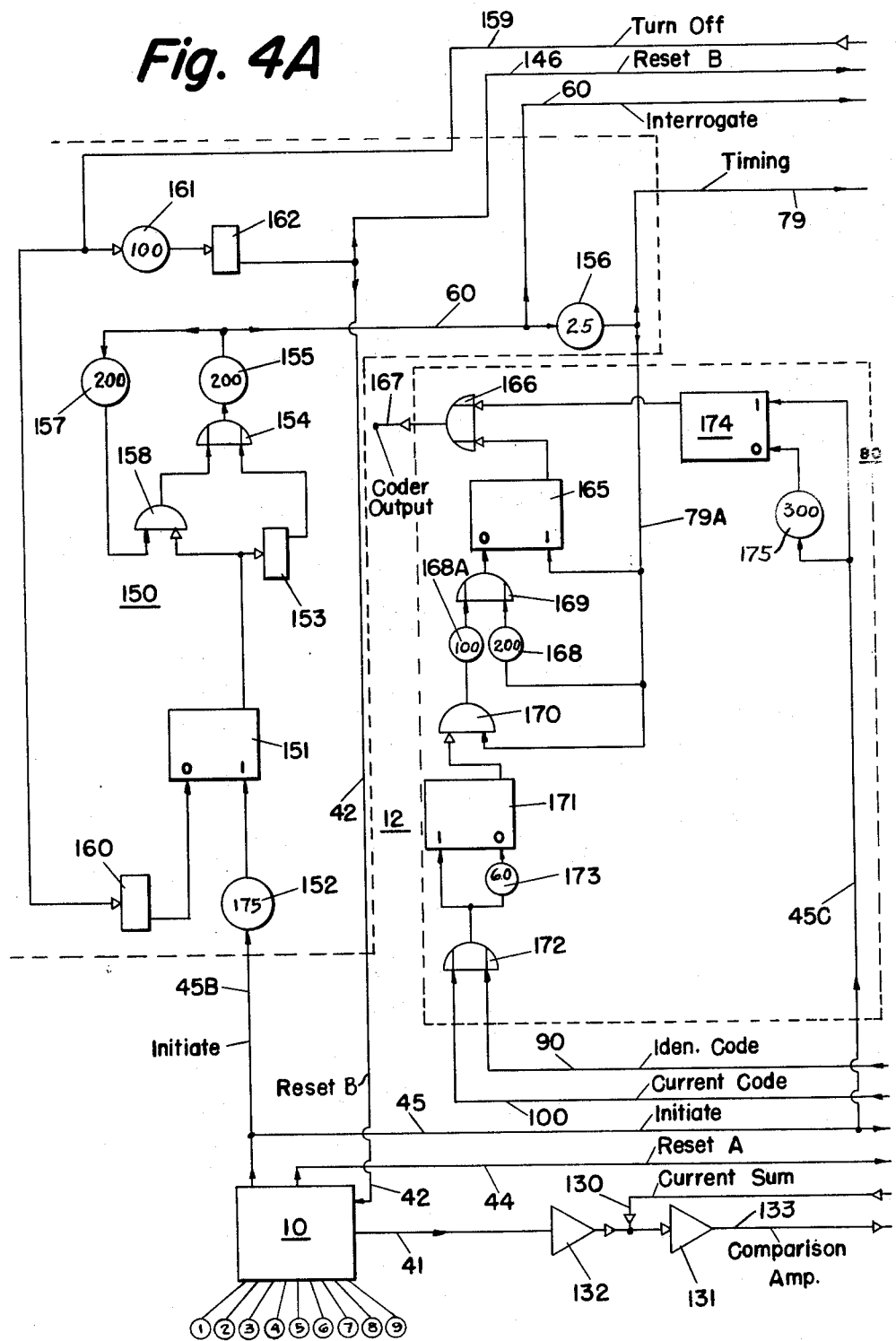

*The Code Signal Pulses and Coding Generator Output Pulses are for Stn#2 with Analog Output of 5.

United States Patent Office 3,145,374
Patented Aug. 18, 1964

3,145,374
HIGH-SPEED MEASURING SYSTEM
Reuben H. Benner 2nd, Haddonfield, N.J., and Albert J. Williams, Jr., Philadelphia, Pa., assignors to Leeds and Northrup Company, Philadelphia, Pa., a corporation of Pennsylvania
Filed Oct. 17, 1958, Ser. No. 767,908
13 Claims. (Cl. 340—183)

This invention relates to the high-speed recording on tape, film or the like of the outputs of a multiplicity of condition-responsive devices; to the display, during the original recording or playback of the tape, of the successive values of the output of a selected condition-responsive device; and to the conversion, at lower speed, of the tape-recorded data for one or more of the responsive devices to other forms of record including typed page, punched card or tape and curve trace.

In accordance with the present invention, the outputs of devices responsive to temperature, pressure, or other condition, as originally transmitted in repeating sequence to the recording head of a tape recorder and as transmitted from the playback head of the recorder to other display or recording apparatus, are respectively encoded as a fixed number of electrical pulses each having one or the other of two finite durations respectively corresponding with ONE and ZERO. Each analog value or magnitude of each measured variable or condition is encoded as a decimal-digit-representing sequence of wide and/or narrow pulses, the number of pulses being the same for all magnitudes of the decimal digit. As transmitted for recording and for playback, the successive groups of pulses accordingly all contain the same number of pulses and thus each group itself contains synchronizing information, so avoiding the need to provide a separate channel for transmission of clock pulses.

Preferably and further in accordance with the invention, in the encoding of the output of each responsive device, the pulses representative of the magnitude of its output are immediately preceded by a group of binary coded pulses which identify that particular condition-responsive device or measurement station. In each identification group, each pulse is of one or the other of two finite durations respectively corresponding with ONE and ZERO, the sequence of the wide and narrow pulses being different for each measuring device or station. The number of pulses used for station identification is the same for all stations. Thus, the complete successive pulse groups each containing station identification and measurement data are all of uniform number of pulses, and there is therefore avoided need for synchronizing pulses from an extraneous source to insure correct interpretation of the recorded pulses as to the originating station and as to the measured output value.

Further in accordance with the invention, there is provided an apparatus which can be preset to accept, during the original recording or during playback, only the measurement data originating at a selected station. More particularly, the apparatus includes a series of gates, all of which are opened to pass data pulses only when the identification pulse group corresponds with the selected station. Thus, the pulse groups passed by the selector apparatus correspond with successive values of the condition at a particular station and so may be used for monitoring that station during the original recording or may be used, by playback of the record for all stations, to analyze the history or performance of any particular station.

Further in accordance with the invention, there is provided an apparatus which translates the output of the playback head into a different coding suited for actuation of the stepping and printing mechanism of an electric typewriter, a tape punch or similar type of equipment. The identification pulses as recoded are used for control of the typing or punching position and the data pulses as recoded are used for control of the characters to be typed or punched.

Further in accordance with the invention, the apparatus which produces the four-pulse, binary-coded-decimal form includes a lockout circuit which insures that each decimal digit is always represented by a unique sequence of pulses despite the fact that in any four-pulse code for representing the digits zero to nine, some digital values may be truly represented by more than one sequence of pulses. This permits simplification of the decoding equipment.

The invention further resides in a data-handling system and sub-combinations thereof having features of novelty and utility hereinafter described and claimed.

For a more detailed understanding of the invention, reference is made in the following description of an embodiment thereof to the accompanying drawings, in which:

FIG. 2 is a pulse diagram referred to in explanation of the encoding of the outputs of the condition-responsive devices, and of identification of the respective devices;

FIG. 2A is a chart of symbols used in subsequent logic diagrams;

Figure 1:
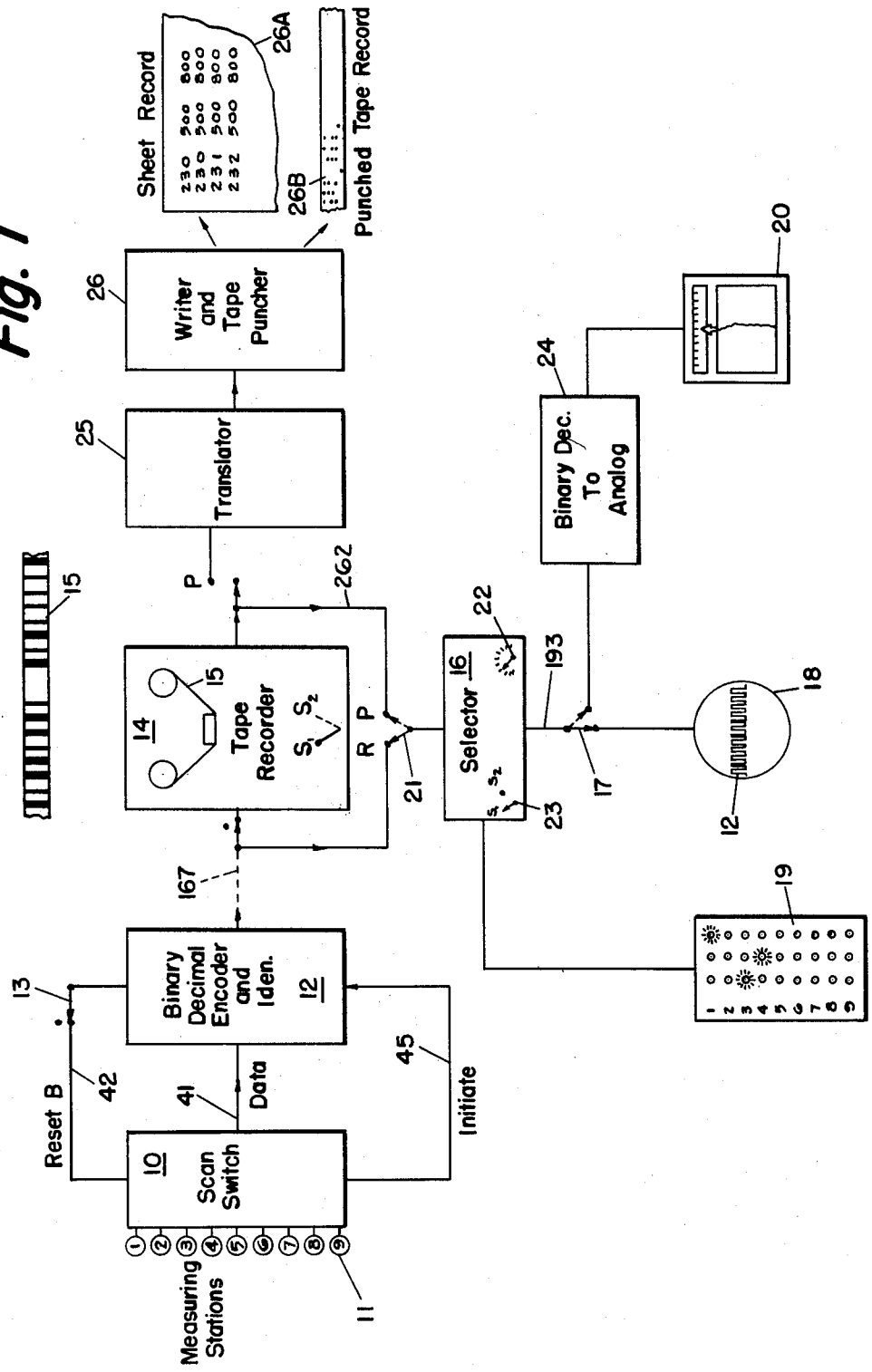
FIG. 1 is a block diagram of a high-speed system for recording the outputs of a multiplicity of condition-responsive devices, for observation or display during such recording of the output of a selected condition-responsive device, and for recording and/or displaying, during playback of the original record, the successive values of the output of any one or more of the condition-responsive devices.
Figure 4B:
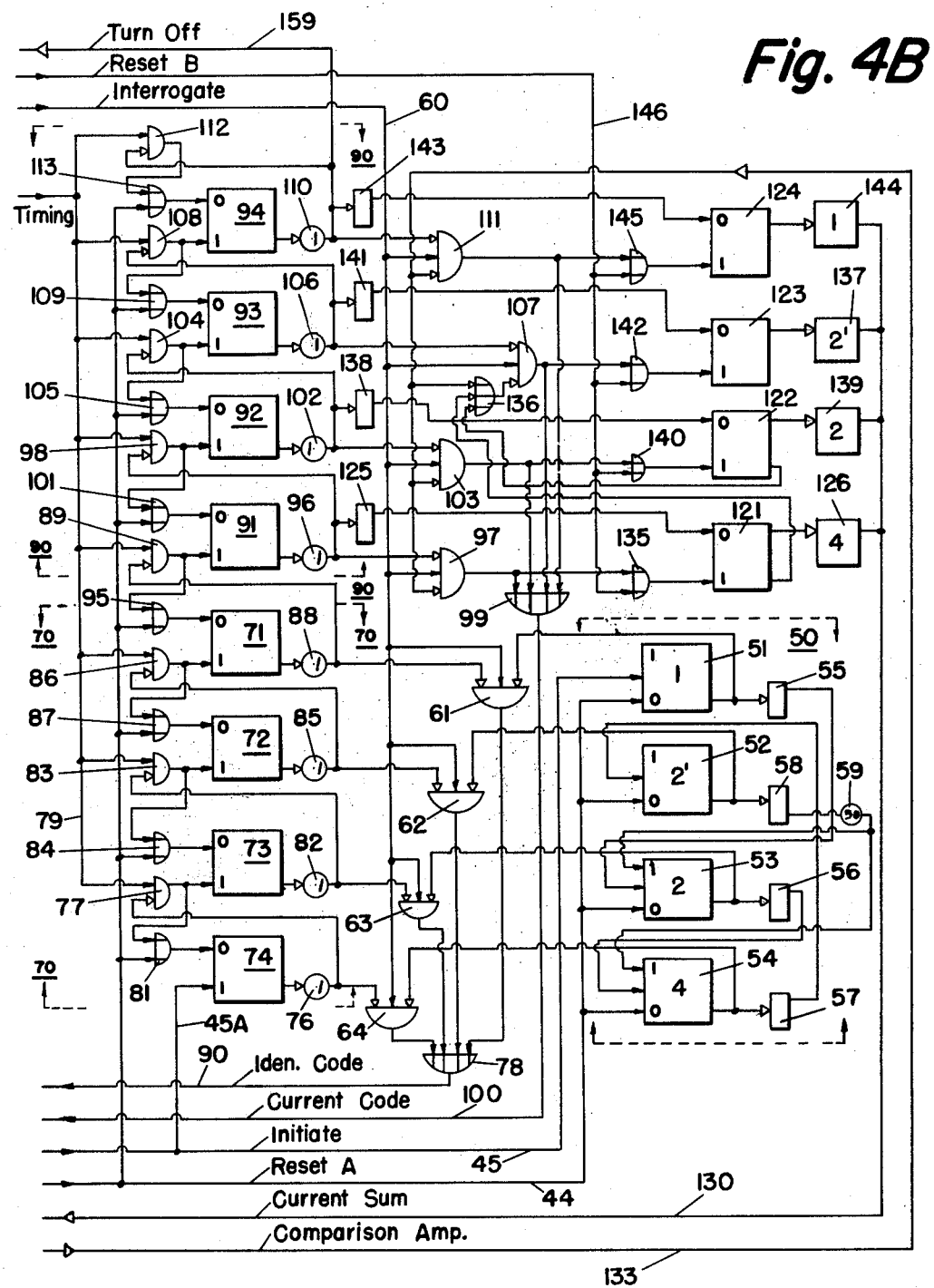
Figure 6:
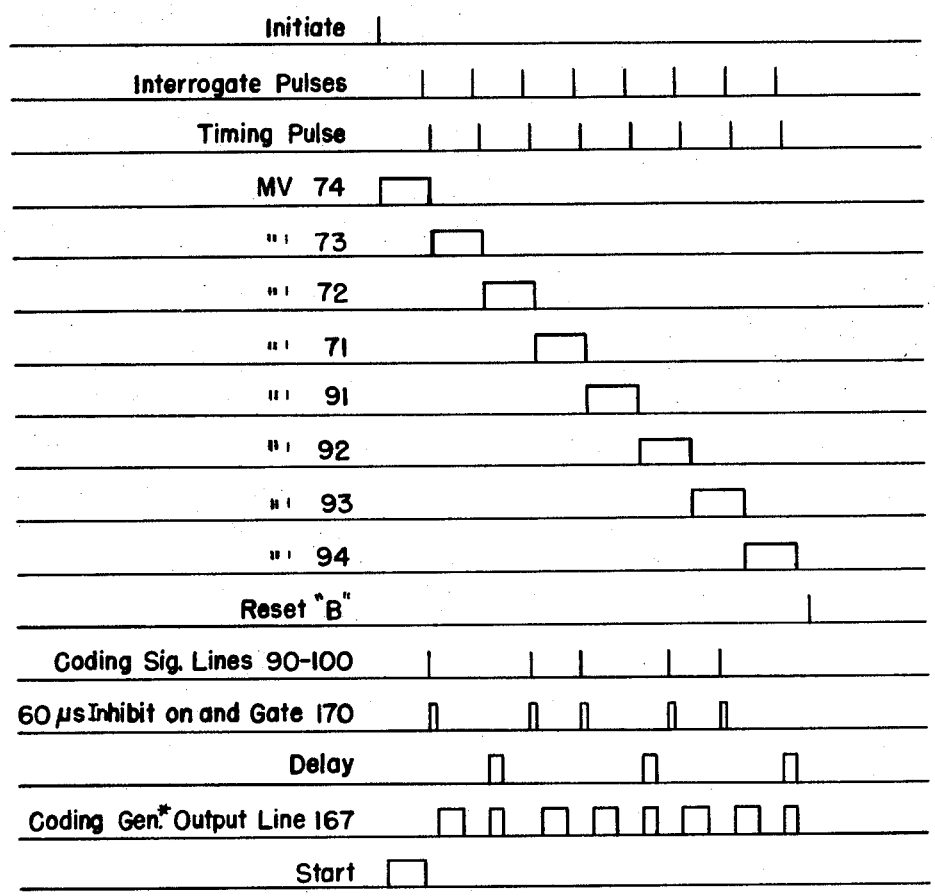
Figure 7:
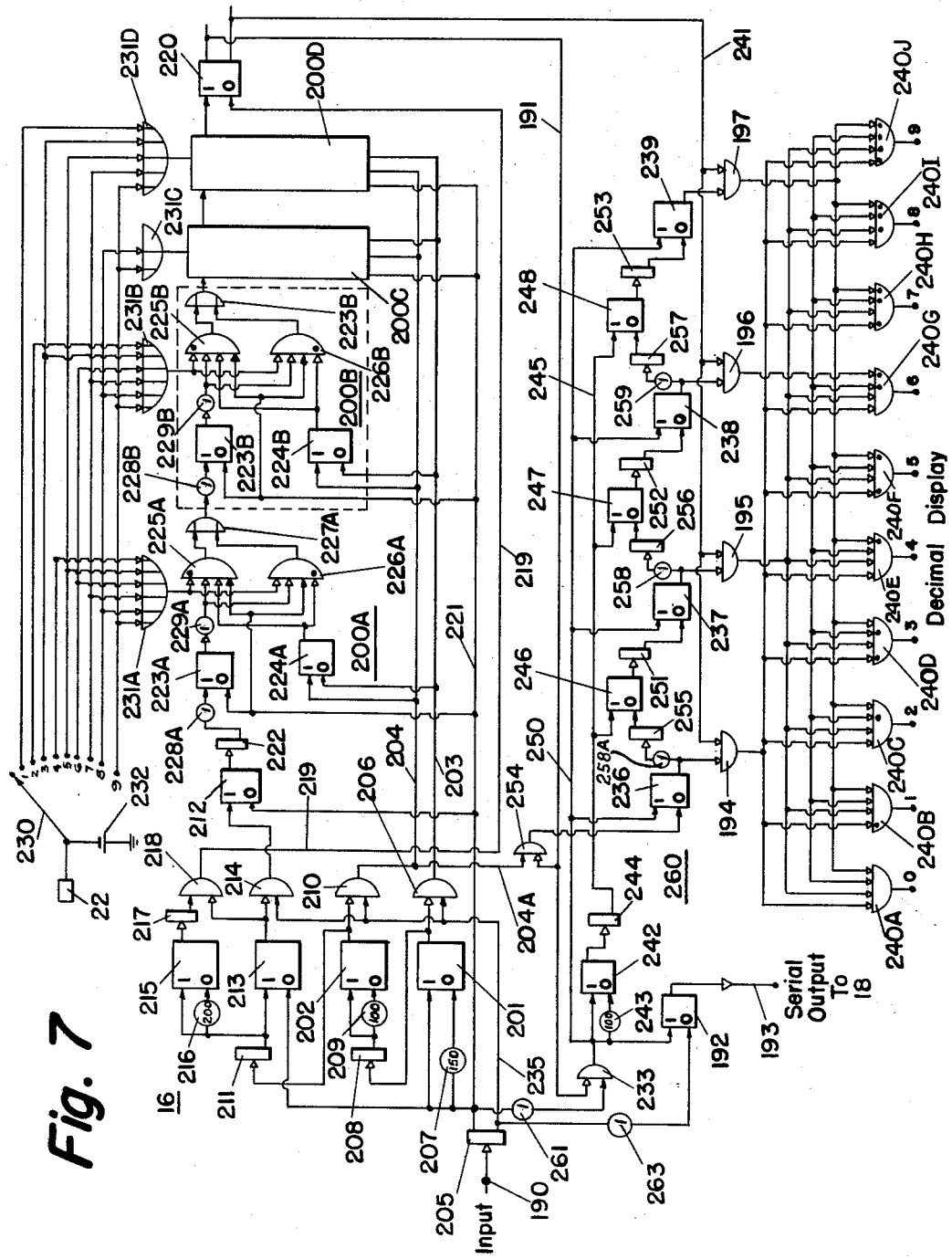

FIGS. 4A and 4B jointly form a logic diagram of the encoder shown in block in FIG. 1;

FIG. 5 is a circuit diagram of one of similar swtiched current sources shown in block in FIG. 4B;

FIG. 6 is a pulse-timing diagram referred to in discussion of FIGS. 4A and 4B;

FIG. 6A is a pulse pattern chart;

FIG. 7 is a logic diagram of the selector shown in block in FIG. 1; and

Figure 8:
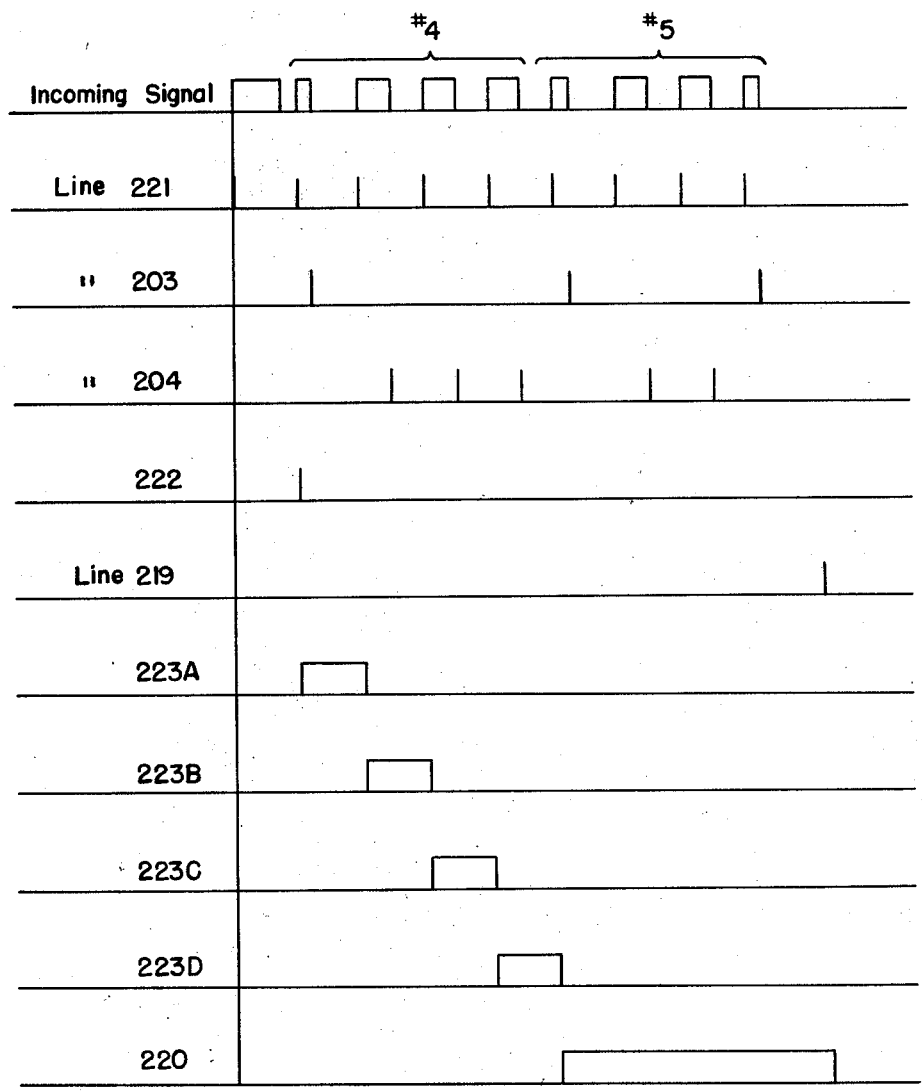

FIG. 8 is a pulse-timing diagram referred to in discussion of FIG. 7.

Referring to FIG. 1 as exemplary of a data-handling system incorporating the invention, the Scan Switch 10 effectively sequentially connects the condition-respensive devices 11 at a multiplicity of measuring stations to the encoder 12 and, as each device 11 is in turn so connected, produces for the encoder a pulse which initiates conversion of the analog output of the measuring device to a binary coded group of pulses. When the Scan Switch 10 is of the asynchronous type, a preferred form of which is subsequently herein described, it receives a reset pulse from the encoder to effect starting of the next scanning cycle; when the Scan Switch 10 is of continuously operating mechanical type, such reset pulse is not required. In the latter case switch 13 in the reset line is opened or the line omitted.

As will later appear in detailed discussion of encoder 12, it also provides for each position of Scan Switch 10 a group of binary coded pulses which identify the particular measuring station then connected to the encoder for conversion of its output to coded pulse form. Thus, for each position of switch 10, the encoder 12 provides a series of pulses or a pulse group, part of which identifies the measuring station then connected to the encoder and part of which represents the then existing magnitude of the condition to which the measuring device 11 of that station is responsive. In each successive cycle of the Scan Switch 10, the encoder 12 produces a succession of such pulse groups each including measurement information and each identifying the station or source from which the information is obtained.

The repeating sequence of pulse groups is transmitted to the recording head of a recorder 14 for serial recording of them on magnetic tape 15 or similar recording medium, such as a light-sensitive film. The scanning of the station outputs, the conversion of such outputs to coded pulses, and the recording of the pulses are effected at high speed. In practice, and by way of example, the outputs of 35 measuring stations are sampled at the scanning rate of two times per second: this involves the encoding and recording of 4200 measurements per minute. Using a four-bit binary decimal code, the pulse groups each include 8 pulses for station identification of up to 100 separate stations and 12 pulses for data information which in the decimal system of notation has three significant figures. Some of the time delays shown in subsequent figures are sufficient to accommodate identification and information pulses of this number. While the data for all stations is being recorded, the output of a particular station may be monitored by applying all of the successive pulse groups to the selector 16. In manner later herein described, the selector 16 may be set to accept only the data pulses for a particular station by using the identification pulses of the successive pulse groups to control an electronic gating means.

With the switch 17 in the full-line position indicated, the data pulses of the selected station are passed by the same selector or gates to a cathode-ray tube 18 whose sweep frequency corresponds with the cycling frequency of the Scan Switch 10. Thus, the magnitude of the measured condition at the selected station is continuously displayed as a pulse pattern, binary coded, to represent the existing decimal value. Alternatively or in addition, the existing value of the output of the selected station may be displayed in decimal form by indicator 19 having, for example, 10 neon lamps respectively representing the digits zero to nine in each of three columns respectively corresponding with units, tens and hundreds. To that end and as later described, which lamp or similar indicator of each column is energized is determined by a switch regulator to be actuated by the data pulses passed by the selector 16.

To present the data recorded at high speed on tape 15 in form better suited for analysis or computing purposes, the tape may be played back with the recorder 14 operating at much lower tape speed, for example, at 2.31 feet per minute as compared with the recording speed of 150 feet per minute. When it is desired to record the output of a particular station on a curve-tracing recorder 20, the selector 16 is connected to the playback head of recorder 14 as by moving switch 21 to its dotted-line position. The dial 22 of selector 16 is set to accept only pulse groups having the identification pattern corresponding with the desired station. The dial 23 of selector 16 is set to increase the time constants of certain circuits later discussed to adapt the selector for pulse recognition at the lower playback speed. The data pulses passed by the gating means of the selector 16 are passed to the decoder 24 wherein they are translated into a corresponding analog input for the recorder 20. Accordingly, the varying magnitude of the measured condition of the selected station is recorded as a curve or trace on the chart of recorder 20. The tape 15 may, of course, be re-run with different settings of the selector 16 to obtain individual curve records for as many of the different stations as required.

When it is desired to have the recorded data converted into printed tabular form, the output of the playback head of recorder 14 is supplied to the translator 25 which converts the coding of the pulses into one suited for actuation of an electric typewriter, such as a "Flexowriter."

The data information pulses as recoded by the translator 25 are used to control actuation of the keys of the typewriter and the identification pulses as recoded by translator 25 are used to advance the carriage to next column position. The identification pulses for the first station are used to return the carriage to the first-column position. Thus, as shown in FIG. 1 by a portion of the resulting printed sheet 26A, the data for the several stations are parallel columns and the numbers successively printed in the individual columns are the successive values of the magnitude of the condition at the corresponding station. The "Flexowriter" is provided with a mechanism which uses the same coding as the typing mechanism to provide a punch tape record suited for use with computing machines. The identification pulses are used to advance the tape between punching of a group of holes representing the value of the measured condition at a particular station in binary form so that the data on the punched tape 26B is serial with respect to stations as on the magnetic tape record.

In the preferred system of coding, the decimal value of each digit of the station identification and of the measurement data is represented by four successive pulses respectively having, in the sequence named, the decimal values of 4 or 0, 2 or 0, 2 or 0, and 1 or 0. Whether a pulse represents a zero or a finite value depends upon the pulse width. It is assumed, for purpose of explanation, that a wide pulse has a value of 0, and that a narrow pulse a value corresponding with its position in the 4, 2, 2, 1 code. For example, the first four pulses in FIG. 2 respectively have the decimal values of 0, 2, 0, 0, or a total of 2: the second four pulses of FIG. 2 respectively have the decimal values of 4, 0, 0, 1, or a total of 5. Thus, assuming a simple system having not more than 10 stations and in which a single decimal value affords the required measurement information, an 8 pulse group provides the station identification and the measurement data. Thus, the first 8 pulses of FIG. 2 identify station #2 and show an analog output of 5 at that station; similarly, the second 8 pulses of FIG. 2 identify station #3 and show an analog output of 8 at that station. From the foregoing, it will be understood that when the number of stations is greater than 10 but not greater than 100, a series of 8 pulses will be used for station identification. Similarly, when the data recorded is to have 2 decimal places, a series of 8 pulses is required for that purpose; for encoding 3 decimal places, a series of 12 pulses is necessary and so on.

To avoid undue complexity in the subsequent figures of drawings, it will be assumed in the following description of the remaining figures that no more than one decade covering 10 measuring stations is involved and that it suffices to record their outputs to one significant decimal figure, i.e., a single decade. To extend the system for a greater number of stations and/or for readings having more than 1 decimal place, involves duplication for each additional decimal place or decade of certain of the networks that are to be described. The chart of logic symbols shown in FIG. 2A is included to facilitate tracing of the operation of the logic circuits of FIGS. 3, 4A, 4B and 7 for any of the many possible pulse combinations. It is not feasible without exceeding reasonable bounds of length of description to trace the pulse paths occurring for more than a few typical examples.

Figure 3:
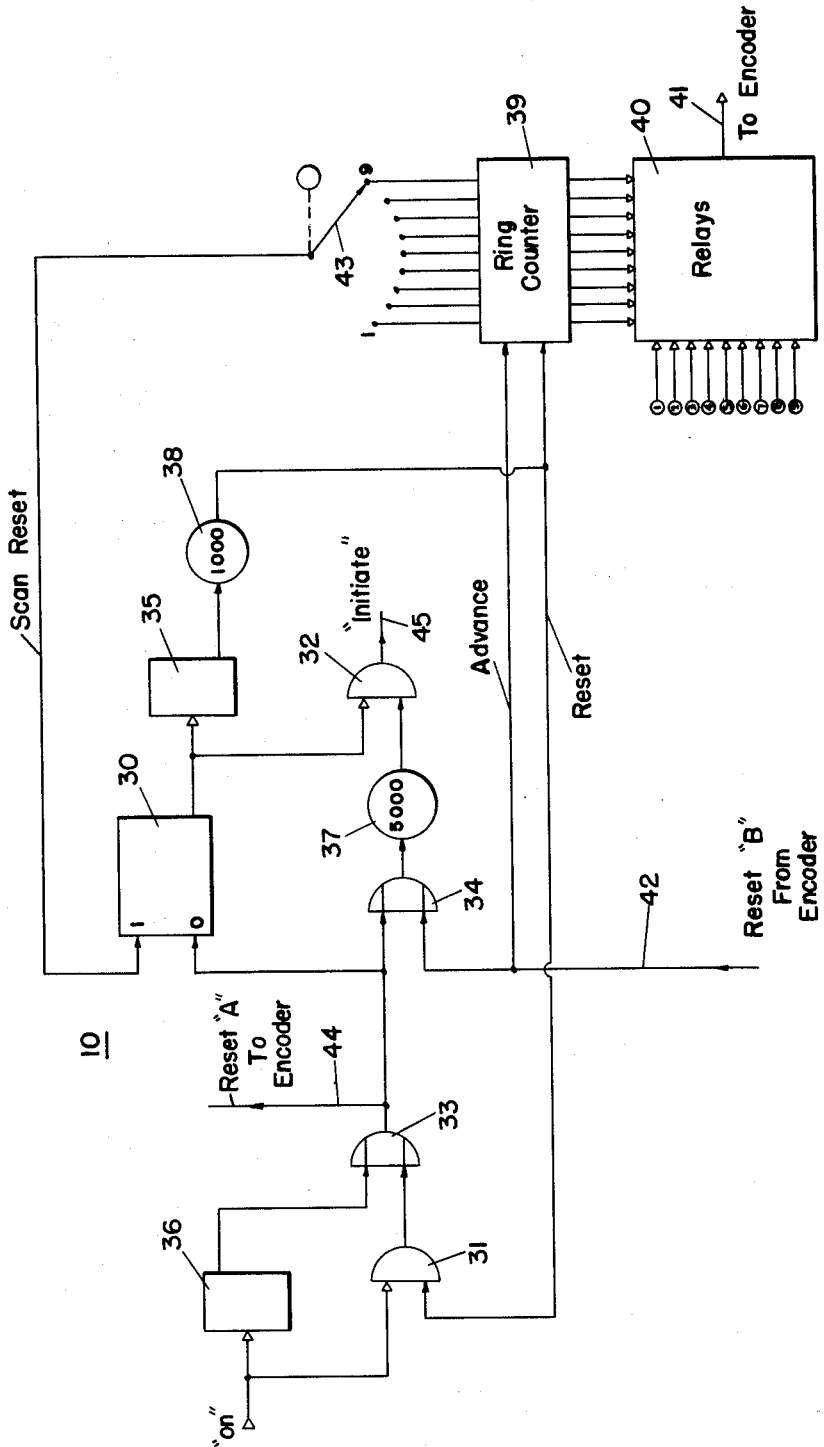
FIG. 3 is a logic diagram of the Scan Switch shown in block in FIG. 1.

The groups of components shown in FIG. 3 are elements of an electronic switching arrangement suited for use as the Scan Switch 10 of FIG. 1. It includes a bi-stable multi-vibrator or flip-flop circuit 30; two AND gates 31, 32; two OR gates 33, 34; a differentiator 35 which produces an output pulse when its input level falls; a differentiator 36 which produces an output when its input level rises; two time-delay devices or networks 37, 38, a ring counter 39; and a relay bank 40. Suitable types of all of these elements are per se known. (Millman and Taub: Pulse and Digital Circuits, McGraw-Hill, 1956).

To start the Scan Swith 10, an ON voltage level is applied to the input circuit of differentiator 36 and to one of the input circuits of AND gate 31. This voltage level is maintained so long as continued operation of the Scan Switch 10 is desired.

An ON level is defined for the purposes of this description as a high level: an OFF level is a low level. Either output side of a flip-flop may be ON at which time the opposite side will be OFF.

The rise in input level of differentiator 36, occurring upon application of the ON voltage, produces a pulse output which is passed by the OR gate 33 to provide a Reset A pulse transmited by line 44 to the encoder (FIGS. 3, 4A, 4B). The pulse output of differentiator 36 is also applied to the 0 input of the flip-flop 30 and to the OR gate 34. The resulting level output of the flip-flop 30 is applied to one input circuit of the AND gate 32. Thereafter the other input circuit of AND gate 32 receives the ON pulse passed by OR gate 34 to the 5000 microsecond delay device 37. With both of its inputs excited, the AND gate 32 produces an Initiate pulse transmitted by line 45 to the encoder 12 (FIGS. 3, 4A, 4B). Upon completion of encoding of the analog output of the measuring device then connected by the relay bank 40 (FIG. 3) to the analog output line 41, the switch 10 receives a Reset B pulse from the encoder over the line 42. As applied to the ring counter 39, the Reset B pulse advances the counter to energize the next relay of the bank 40 so that the output of the next measuring device is applied to the analog output line 41. The Reset B pulse is also applied to the AND gate 32 through the OR gate 34 and delay line 37. Since the other input of the AND gate 32 is still at high level, another Initiate pulse is produced for the encoder.

This stepping of the switch 10 continues until the ring counter 39 is advanced to a state or position corresponding with the setting of a switch 43, whereupon the output of the counter 39 is applied to the 1 input of the flip-flop 30. The resulting decrease in output level of the flip-flop 30 as applied to differentiator 35 produces an output pulse which, after a brief delay of about 1000 microseconds, is applied to the ring counter 39 to reset it to its first position to start a new scanning cycle of a number of stations as selected by the switch 43.

The output of the difierentiator 35 is also applied to the AND gate 31 whose other input is still at the elevated ON level. The resulting output pulse of AND gate 31 is passed or repeated by OR gate 33 to provide another Reset A pulse for the encoder and as applied to the OR gate 34 and to the 0 input of bistable multi-vibrator 30 again results in production of an Initiate pulse by AND gate 32.

All of the foregoing operations of the Scan Switch occur within a small fraction of a second. From this time on, and for so long as the ON level is maintained on one of the input circuits of AND gate 31, the measuring stations are successively and in repeating sequence each connected to the output line 41 of the switch for conversion, by the encoder, of its analog output to a group of binary coded pulses.

Referring now to the particular encoder arrangement shown in FIGS. 4A and 4B, the Initiate pulses produced by the Scan Switch 10 are transmitted by line 45 to a station counter 50 comprising in the 9-station system under discussion four multi-vibrator or flip-flop circuits 51–54. As discussed below in detail, the Initiate pulses actuate the counter 50 so that its binary coded output successively represents the decimal values 1–9 as the corresponding measuring stations Nos. 1–9 are sequentially connected by the Scan Switch to the encoder.

The Reset A pulse, produced by switch 10 as above described in the interval between the completion of one scanning cycle and the beginning of the next, is applied over line 44 to the lower input terminals of all of the flip-flops of counter 50 to set each of them so that it has an output level corresponding with a ONE in the binary code. For clarity, this will be referred to as the ON state.

The first Initiate pulse from the Scan Switch 10 is applied over line 45 to the intermediate input circuit of the flip-flop 51, whereupon its output level falls to a ZERO or OFF state. Since the differentiator 55 is of type which produces an output pulse only upon a rise in input level, the effect of the first Initiate pulse does not go beyond flip-flop 51. Consequently, during the ensuing encoding interval for station #1, the flip-flop 51 is effectively OFF and the remainder of the flip-flops 52 to 54 are effectively ON.

When the second Initiate pulse from the Scan Switch 10 is applied over line 45 to the intermediate input terminal of flip-flop 51, its output level rises, whereupon the differentiator 55 produces an output pulse which is applied to the intermediate input terminal of the flip-flop 53 to drop its output level. Since differentiator 56 is of type producing an output only upon rise in its input level, the effect of the second Initiate pulse goes no further. Thus, during the ensuing encoding interval for station #2, the flip-flop 53 is effectively OFF and the flip-flop 51, 52 and 54 are effectively ON.

When the third Initiate pulse from Scan Switch 10 is applied to the intermediate input circuit of flip-flop 51, its output level again drops. The differentiator 55 does not respond so that during the encoding interval for station #3 the flip-flops 51 and 53 are effectively OFF and the flops 51, 52 and 54 are effectively ON.

When the fourth Initiate pulse from the Scan Switch 10 is similarly applied to flip-flop 51, its output level again rises, whereupon differentiator 55 produces an output pulse which as applied to the intermediate terminal of flip-flop 53 raises its outputl evel. Differentiator 56 responds to the rise of its input level to produce an output pulse which as applied to the intermediate terminal of flip-flop 54 causes its output level to fall. Since the differentiator 57 is of type which does not respond to a fall of its input level, the effect of the fourth Initiate pulse proceeds no further. Accordingly, during the encoding interval for station #4, the flip-flops 51, 52 and 53 are effectively ON and the flip-flop 54 is effectively OFF.

When the fifth Initiate pulse from Scan Switch 10 is applied over line 45 to flip-flop 51, the output level thereof again falls. The differentiator 55 produces no output for this sense of change of its input level, with the result that during the encoding interval for station #5, the flip-flops 51 and 54 are effectively OFF and flip-flops 52, 53 are effectively ON.

When the sixth Initiate pulse from Scan Switch 10 is applied to flip-flop 51, the output level thereof again rises. The resulting output pulse of differentiator 55 as applied to the intermediate input circuit of flip-flop 53 causes its output level to fall. The differentiator 56 produces no output pulse for this sense of change of its input level. In consequence, during the encoding interval for station #6, the flip-flops 51 and 52 are effectively ON and the flip-flops 53 and 54 are effectively OFF.

When the seventh Initiate pulse from Scan Switch 10 is applied to flip-flop 51, the output level thereof again falls. The differentiator 55 does not respond to the fall of its input level and therefore during the encoding interval for station #7, the flip-flops 51, 53 and 54 are OFF and the flip-flop 52 is ON.

When the eighth Initiate pulse from Scan Switch 10 is applied to flip-flop 51, the output level thereof again rises. The resulting output pulse of differentiator 55 as applied to the intermediate input circuit of flip-flop 53 causes its output level to rise. The differentiator 56 accordingly produces an output pulse which as applied to the intermediate terminal of flip-flop 54 causes its output level to rise. The differentiator 57 responds to the rise of its input level to produce an output pulse which as applied to the intermediate input circuit of flip-flop 52 causes its output level to fall. The differentiator 58 responds to the fall of its input level to produce an output pulse which, after a delay of about 50 microseconds afforded by delay 59, is applied to the upper input circuit of flip-flop 53 and 54 to reduce their output level. Since the differentiators 56 and 57 do not respond to this sense of change of their input levels, the effect of application of the eighth Initiate pulse proceeds no further. Thus, during the ensuing encoding interval for station #8, the flip-flop 51 is effectively ON and the flip-flop 52, 53 and 54 are effectively OFF.

When the ninth Initiate pulse from Scan Switch 10 is applied to the intermediate input circuit of flip-flop 51, the output level thereof is reduced. Since differentiator 55 produces no output for a decrease of its input level, the effect of the ninth Initiate pulse here terminates in the counter 50. Thus, during the encoding interval for station #9, all of the flip-flops 51 to 54 are effectively OFF.

From the foregoing description of the operation of counter 50, it will be appreciated that the concurrent outputs of the flip-flops 51 to 54 are all of different pattern for each of the successive encoding intervals of a scan cycle. Thus, different patterns as successively stored in counter 50 are used as described below to form the different identification pulse groups for the different measuring stations. Table I below indicates the output state or level of each of the bistable multi-vibrators 51 to 54 after application of each initiate pulse of a scan and after the Reset A pulse for the next scan.

Table I

|  | FF. 51 | FF. 52 | FF. 53 | FF. 54 |
|---|---|---|---|---|
| Reset A | ON | ON | ON | ON |
| #1 Initiate | OFF | ON | ON | ON |
| #2 Initiate | ON | ON | OFF | ON |
| #3 Initiate | OFF | ON | OFF | ON |
| #4 Initiate | ON | ON | ON | OFF |
| #5 Initiate | OFF | ON | ON | OFF |
| #6 Initiate | ON | ON | OFF | OFF |
| #7 Initiate | OFF | ON | OFF | OFF |
| #8 Initiate | ON | OFF | OFF | OFF |
| #9 Initiate | OFF | OFF | OFF | OFF |

The output levels of the bistable multi-vibrators 51 to 54 are respectively applied to the AND gates 61 to 64. Each of these AND gates has two other input circuits; one excited by timed interrogation pulses produced on line 60 of the encoder, and the other excited by the output level of a corresponding one of the four bistable multi-vibrators or flip-flops 71 to 74 which are used in the formation of the coded pulse groups respectively identifying the nine measuring stations.

At the same time each Initiate pulse is applied to flip-flop 51 of the station counter register 50, it is also applied over line 45A to the lower input circuit of flip-flop 74 of the station-identification ring-counter 70. The resulting output level of a binary ONE is applied, after a brief delay of about 1 microsecond introduced by delay 76, to the AND gates 64 and 77. After an interval of about 375 microseconds from the Initiate pulse, an interrogation pulse is applied over line 60 and so activates a second input circuit of the AND gate 64. If at that time the third input circuit of AND gate 64 is activated by the output level of flip-flop 54 of the station counter register 50, the resulting output pulse of AND gate 64 is passed by OR gate 78 and impressed upon identification code pulse line 90. If on the contrary, the third input circuit of AND gate 64 is not activated when the first interrogation pulse arrives, no pulse is impressed on the identification code line 90.

About 25 microseconds after the first interrogation pulse, a timing pulse impressed on line 79 is effectively applied to the second input circuit of AND gate 77. Since at that time the first input circuit of AND gate 77 is activated by the output level of flip-flop 74, this gate produces an output pulse which is applied through OR gate 81 to the upper input circuit of flip-flop 74 to return it to the OFF state. The output pulse of the AND gate 77 is also applied to the lower input circuit of the second flip-flop 73 to turn it ON. The delay, inherently present or inserted by delay device 76 previously referred to, insures that the AND gate will remain activated for a time sufficiently long to turn ON flip-flop 73 regardless of the relative responses for turning OFF flip-flop 74 and turning ON flip-flop 73. The resulting ONE output level of flip-flop 73 is applied after a brief delay afforded by delay device 82 to the AND gates 63 and 83. After an interval of 400 microseconds from the aforesaid first interrogation pulse, a second interrogation pulse on line 60 is effectively applied to a second input circuit of the AND gate 63. If at that time the third input circuit of AND gate 63 is activated because bistable multi-vibrator 53 is in the ON state, the AND gate 63 produces an output pulse which is passed by the OR gate 78 to the identification code line 90. If on the contrary, the third output circuit of AND gate 63 is not activated by bistable multi-vibrator 53 when the second interrogation pulse is applied, no pulse is passed on to the identification code line 90.

About 25 microseconds after this second interrogation, a second timing pulse on line 79 is effective to pass through the AND gate 83 because the other input circuit thereof is then still activated by the ONE output level of the preceding flip-flop 73. The resulting output pulse of AND gate 83 is applied through OR gate 84 to the upper input circuit of flip-flop 73 to turn it OFF. The output pulse of AND gate 83 is also applied to the lower input circuit of the third flip-flop 72. The resulting ONE output level of flip-flop 72 is applied, after a brief delay introduced by delay device 85, to the AND gates 62 and 86. Thus, when the third interrogation pulse is applied to line 60, whether or not the AND gate 62 produces an output pulse, depends upon whether or not its third input circuit is activated by the output level of flip-flop 52. If flip-flop 52 is ON at the time of this third interrogation, the AND gate 62 produces a pulse which is passed by OR gate 78 to the identification code line 90. If the flip-flop 52 is OFF at the time of the third interrogation, no pulse is produced or passed to the identification code line 90.

About 25 microseconds after such third interrogation, the third timing pulse applied to line 79 passes through the AND gate 86 because its other input circuit is then still activated by the ONE output level of flip-flop 72. The resulting output pulse of AND gate 86 is applied through OR gate 87 to the upper input of flip-flop 72 to turn it OFF. The output pulse of AND gate 86 is also applied to the lower input circuit of flip-flop 71 to turn it ON. The resulting ONE output level of flip-flop 71 is applied, after a brief delay introduced by delay device 88, to the AND gates 61 and 89.

When the fourth interrogation pulse is applied to line 60, the AND gate 61 will therefore produce a pulse if its third input circuit is at that time activated by the output level of flip-flop 51 of the station counter 50; otherwise not. In the former case, the AND gate 61 produces an output pulse passed by the OR gate 78 to the identification code line 90. In the latter case, the fourth interrogation pulse does not result in the formation and application of a pulse to the identification code line 90.

From the portions of FIG. 4B thus far described, it will be understood that for each of the aforesaid four interrogations a pulse is produced on the identification code line 90 only when the output levels of a flip-flop in the identification ring counter 70 and the output of the corresponding flip-flop in the station counter 50 are at the ONE level. Thus, by reference to Table I in the preceding description of the control of AND gates 61 to 64, it will be appreciated that the number of pulses produced on the identification code line 90 for the first four interrogations following an Initiate pulse will vary from zero to four and with varying time relationships between the pulses. Such binary decimal coding of the identification pulses on line 90 may therefore be represented by Table II below where "X" indicates the presence of a pulse.

Table II

| Stored Station | Identification Pulses (line 90) (Interrogation) | | | |
|---|---|---|---|---|
| | 1 | 2 | 3 | 4 |
| #1 | | X | X | X |
| #2 | X | X | | X |
| #3 | | X | | X |
| #4 | X | X | X | |
| #5 | | X | X | |
| #6 | X | X | | |
| #7 | | X | | |
| #8 | X | | | |
| #9 | NONE | | | |

This type of coding, requiring a separate channel for transmission of periodic timing or clock impulses for unambiguous interpretation of the station identification, is converted by the pulse width encoder 80 (FIG. 4A) later described to pulse-duration coding shown in FIG. 2 of a fixed number of pulses, which itself affords all the synchronizing information required for proper decoding.

The four flip-flops 74 to 71 (FIG. 4B) which produce the identification code pulses of Table II precede a second series of four flip-flops 91 to 94 which are used to produce a similar binary-decimal encoding of the analog output of each of the nine measuring stations as it in turn is connected to the encoder.

The flip-flops 91–94 are in succession turned ON and OFF by the fourth to eighth timing pulses applied to line 79 in the same manner above described as the flip-flops 74 to 71 are successively turned ON and OFF by the Initiate pulse and the following four timing pulses. The fourth timing pulse is effectively applied through AND gate 89 and OR gate 95 to turn the flip-flop 71 OFF and through the AND gate 89 to turn the flip-flop 91 ON. The resulting ONE output of flip-flop 91, after the delay introduced by delay device 96, is applied to the AND gates 97 and 98, the former being effective as later described to determine whether or not a pulse is supplied to the current-code line 100 through the OR gate 99 upon application of the fifth interrogation pulse to line 60.

The fifth timing impulse is effectively applied through AND gate 98 and OR gate 101 to turn the flip-flop 91 OFF and is effective through the AND gate 98 to turn the flip-flop 92 ON. The resulting ONE output of flip-flop 92, after the delay afforded by delay device 102, is applied to the AND gates 103 and 104. AND gate 103 is effective upon application of the sixth interrogation pulse to determine whether or not a pulse is produced and supplied to the current-code line 100 through the OR gate 99.

The sixth timing impulse applied to line 79 is effective through AND gate 104 and OR gate 105 to turn the flip-flop 92 OFF, and through the AND gate 104 to turn the flip-flop 93 ON. The resulting ONE output of flip-flop 93, after delay afforded by delay device 106, is applied to AND gates 107 and 108. AND gate 107 is effective upon application of the seventh interrogation pulse to determine whether or not a current-code pulse is supplied through OR gate 99 to the current-code line 100.

The seventh timing pulse applied to line 79 is effective through AND gate 108 and OR gate 109 to turn the flip-flop 93 OFF, and through AND gate 108 to turn the flip-flop 94 ON. The resulting ONE output of flip-flop 94, after the delay introduced by delay device 110, is applied to the AND gates 111 and 112. The AND gate 111 is effective upon application of the eighth interrogation pulse to determine whether or not the AND gate 111 produces a coding pulse for transmission through AND gate 99 to the current-code line 100.

The eighth timing pulse applied to line 79 is effective through AND gate 112 and OR gate 113 to turn the flip-flop 94 OFF. This completes the sequential operation of the two decades of ring-counter flip-flop circuits used for identification and data coding in the nine-station system under discussion. At this time the output level of all of the flip-flops 74 to 71 and 91 to 94 is zero. If such sequence has not been completed for any reason, such as shut-down of the system, the next Reset A pulse from the Scan Switch 10 (FIG. 4A) is effective, as applied to the OR gates 81, 84, 87, 95, 101, 105, 109 and 113 to reset all of these flip-flops to their OFF state in condition properly to respond to the next Initiate signal and the following series of interrogation and timing pulses.

By reason of the selection of AND gates 61–64, 97, 103, 107 and 111 by the flip-flops 74–71 and 91–94, each of the interrogation pulses applied to line 60 in parallel to all of the AND gates 61–64, 97, 103, 107 and 111 will produce an output pulse on line 90 in accordance with the information appearing at only the selected one of the AND gates.

As stated above, while each one of the flip-flops 91 to 94 is in sequence turned ON to supply a ONE level to one of the input circuits of associated AND gates 97, 103, 107 or 111, an interrogation pulse on line 60 is applied to a second input circuit of such AND gate. Whether any of these AND gates produces an output pulse depends upon whether or not its third input circuit, at the time of its interrogation, is activated by the output level of an associated one of the flip-flops 121 to 124 which are utilized as now described in the conversion of the analog outputs of the condition-responsive devices 11 at the measuring stations 1 to 9 into coded pulse groups.

When the flip-flop 91 is turned ON, as above described, to activate one of the input circuits of AND gate 97, the rise in output level of flip-flop 91 is effective as applied to differentiator 125 to produce an output pulse applied to the upper input circuit of flip-flop 121. The resulting change in level of the upper output circuit of flip-flop 121 effectively turns ON a current source 126, as will later be more fully explained in discussion of FIG. 5, to supply to the Current-Sum line 130 a current having the analog value of 4.

This current from source 126 is applied over line 130 to the input circuit of the high-gain comparison amplifier 131 (FIG. 4A) in opposition to the output current of the amplifier 132 supplied from that one of the condition-responsive devices 11 then connected by Scan Switch 10 to the input line 41 of amplifier 132. If the current supplied from source 126 to comparison amplifier 131 is equal to or less than the current supplied by the analog input amplifier 132, the output level of comparison amplifier 131, as applied over line 133 (FIG. 4B) to a second of the input circuits of AND gate 97, is insufficient to permit opening of this gate so that when an interrogation pulse is applied by line 60 to the third input circuit of this gate, no pulse appears at the output of AND gate 97. In such case, the flip-flop 121 is left turned ON and the source 126 continues to supply current having a value of 4 to the Current-Sum line 130.

If, on the other hand, the output of the analog input amplifier 132 has a value less than 4, the output level of amplifier 131, as applied to the second input circuit of gate 97, is sufficient to insure opening of AND gate 97 so that when an interrogation pulse is applied to the third input circuit thereof, an output pulse appears at the output of AND gate 97. The resulting output pulse of AND gate 97 is applied to the OR gates 99 and 135: as applied to OR gate 99, this output pulse provides a current-code pulse on line 100: as applied to OR gate 135, this output pulse of gate 97 is passed to the lower input circuit of flip-flop 121 to turn OFF the current source 126 and to provide from the lower output circuit of flip-flop circuit 121 an output level of ONE which is applied through OR gate 136 to one of the input circuits of AND gate 107. As will become evident, this OR gate 136 is part of a lock-out arrangement which prevents the current source 137 from being left in the ON state except when the analog input to comparison amplifier 132 (FIG. 4A) has a value of 8 or higher. In brief résumé, with the flip-flop 91 in the ON state, an interrogation pulse on line 60 will result in a pulse on the current-code line 100 if the analog input value is less than 4.

When the flip-flop 92 is turned ON and the flip-flop 91 turned OFF, as previously described, to activate one of the input circuits of AND gate 103, the rise of its output level, as applied to differentiator 138, produces an output pulse applied to the upper input circuit of flip-flop 122. The resulting change in level of the upper output circuit of flip-flop 122 effectively turns on a current source 139 which supplies to the Current-Sum line 130 a current having the analog value of 2.

Thus, if the current source 126 is also ON because the analog input under measurement has a value greater than 4, the total current supplied by the two sources 126, 129 and applied by line 130 to the input circuit of the comparison amplifier 131 (FIG. 4A) will have a value of 6.

If the concurrent analog input of amplifier 132 has a value of at least 6, the resulting output level of comparison amplifier 131, as applied by line 133 to the second input circuit of AND gate 103, is insufficient to permit opening of this AND gate so that when an interrogation pulse is applied by line 60 to the third input circuit of that gate, no pulse will appear at the output of AND gate 103. In such case, the flip-flop 122 is left turned ON, and both current sources 126 and 139 continue to supply current having a value of 6 to the Current-Sum line 130. In such case the application of an interrogation pulse does not result in the production of a pulse on the current-code line 100.

If, on the other hand, the analog input of amplifier 132 has a value less than 6, the output level of comparison amplifier 131, as applied by line 133 to the second input circuit of AND gate 103, is sufficient to insure opening of that gate so that when an interrogation pulse is applied to its third input circuit, a pulse appears at the output of AND gate 103. The resulting output pulse of AND gate 103 is applied to the OR gates 99 and 140. As applied to OR gate 99, such output pulse of AND gate 103 provides a current-code pulse on current-code line 100; as applied to OR gate 140, such output pulse is passed to the lower input circuit of flip-flop 122 to turn OFF the current source 139 and to provide from the lower output circuit of flip-flop 122 an output level of ONE which is applied through the OR gate 136 to one of the input circuits of AND gate 107. As will appear, the OR gate 136 prevents the source 137 from remaining in ON state when either or both of the current sources 126 and 139 are not supplying current to line 130 and so cannot be used in providing a current-sum value of 6, 4 or 2.

If, however, when the current source 139 is turned ON and the current source 126 is OFF, because it has been determined by previous interrogation that the analog input under measurement is of value less than 4, the current on line 130 is supplied only by source 139 and has a value of 2. If the concurrent analog input has a value of at least 2, the resulting output level of comparison amplifier 131, as applied by line 133 to the second input circuit of AND gate 103, is insufficient to permit opening of this gate so that when an interrogation pulse is applied by line 60 to its third input circuit, no pulse output appears from AND gate 103. In such case, the flip-flop 122 is left turned ON and the current source 139 continues to supply to the Current-Sum line 130 a current having the value of 2.

If, on the other hand, the analog input has a value less than 2, the output level of comparison amplifier 131, as applied by line 133 to the second input circuit of AND gate 103, is sufficient to insure opening of that gate so that when an interrogation pulse is supplied to its third input circuit from line 60, a pulse appears at the output of AND gate 103. The resulting output pulse of AND gate 103 is applied to the OR gates 99 and 140. As applied to OR gate 99, this output pulse produces a current-code pulse on line 100; as applied to OR gate 140, such output pulse is passed to the lower input circuit of flip-flop 122 to turn OFF the current source 139 and also to provide from the lower output circuit of flip-flop 122 an output level of ONE which is applied through OR gate 136 to one of the input circuits of AND gate 107. This prevents the source 137 from remaining ON unless both of the current sources 126 and 139 are supplying current to line 130.

Thus, in brief résumé, with the flip-flop 92 in the ON state, an interrogation pulse on line 60 will result in a pulse on the current-code line 100 if the analog input value is greater than 4 but less than 6 or greater than 0 but less than 2.

When the flip-flop 93 is turned ON, as previously described, to activate one of the input circuits of AND gate 107, the rise of its output level as applied to differentiator 141 produces an output pulse applied to the upper input circuit of flip-flop 123. The resulting change in level of the upper output circuit of flip-flop 123 effectively turns ON the current source 137 which supplies to the Current-Sum line 130 a current having the value of 2. At this time, depending upon the analog value being measured, both of the other current sources 126, 139 may be OFF; both of them may be ON; or either of them may be OFF and the other ON. Thus the current on the Current-Sum line 130 to the input circuit of comparison amplifier 131 (FIG. 4A) may have any one of the values 2, 4, 6 or 8.

If both of the other current sources 126, 139 are OFF, the second input circuit of AND gate 107 is in activated state because the ONE output level from the lower output circuits of the associated flip-flops 121, 122 is passed by OR gate 136 to such second input circuit of AND gate 107. Further, if only one of the other current sources 126, 139 is ON, the second input circuit of AND gate 107 is in activated state because the ONE level output from the lower output circuit of one of the associated flip-flops 121, 122 is passed by the OR gate 136 to such second input of AND gate 107. The second input circuit of AND gate 107 is also activated through OR gate 136 by the output level of the comparison amplifier 131 when the analog input has a value less than 8. If both of the other current sources 126, 139 are ON and the value of the analog input to amplifier 132 is less than 8, the output level of the comparison amplifier 131 as applied to the second input circuit of AND gate 107 through OR gate 136 is sufficient to insure opening of AND gate 107 so that when the interrogation pulse is applied to its third input circuit, a pulse appears at the output of AND gate 107. Thus, for any of these stated conditions, the AND gate 107 produces an output pulse when an interrogation pulse is applied by line 60 to the third input circuit of AND gate 107. This output pulse of AND gate 107 is applied to the OR gates 99 and 142. As applied to the OR gate 99, this output pulse of AND gate 107 results in production of a pulse on the current-code line 100. As applied to OR gate 142, the output pulse of AND gate 107 is effective to reverse the flip-flop 123 and thereby turn OFF the current source 137.

If both of the other current sources 126, 139 are ON and the value of the analog input to amplifier 132 is at least 8, the output level of comparison amplifier 131 as applied to the second input of AND gate 107 is insufficient to insure opening of this gate so that when an interrogation pulse is applied to its third input circuit, no pulse appears in the output. Thus, under this circumstance, the current source 137 is left ON so that the current on the Current-Sum line 130 has a value of 8.

Thus, when the seventh interrogation pulse is applied to line 60, a pulse will appear on the current-code line 100 unless the measured analog value is 8 or higher.

When the flip-flop 94 is turned ON, as previously described to activate one of the input circuits of AND gate 111, the rise of its output level as applied to differentiator 143 produces an output pulse which is applied to the upper input circuit of flip-flop 124. The resulting change in level of the upper input circuit of flip-flop 124 effectively turns ON the current source 144 which supplies to the Current-Sum line 130 a current having the value of 1. At this time, depending upon the analog value being measured, all of the current sources 126, 137 and 139 may be OFF; either of the current sources 126, 139 may be OFF and the other ON; also at this time the current source 137 may be ON but only if the current sources 126 and 139 are both ON. Thus, the current on the Current-Sum line 130 may have any one of the values 1, 3, 5, 7 or 9. It is to be noted, however, that because of the lockout afforded by OR gate 136, the current source 137, although having an output current value of 2, cannot contribute in providing a Current Sum value of 3, 5 or 7 on line 130.

If when the current source 144 is turned ON all of the other current sources 126, 137, 139 are OFF because it has been determined by previous interrogation that the analog input being measured is of value less than 2, the current on line 130 is supplied only by source 144 and has a value of 1. If the analog input has a value of at least 1, the resulting output level of comparison amplifier 131, as applied over line 133 to the second input circuit of AND gate 111, is insufficient to permit opening of this gate. Consequently, when the eighth interrogation pulse is applied to the third input circuit of AND gate 111, it remains closed and produces no output pulse. In this case, the flip-flop 124 is left turned ON and source 144 continues to supply current to the Current Sum line 130.

If, on the other hand, the analog input has a value of less than 1, the resulting output pulse level of comparison amplifier 131, as applied to the second input circuit of AND gate 111, is sufficient to insure opening of this gate when the eighth interrogation pulse is applied to its third input circuit. The resulting output pulse of AND gate 111 is applied to the OR gates 99 and 145. As applied to OR gate 99, such output pulse produces a current-code pulse on line 100, as applied to OR gate 145, such output of AND gate 111 is passed to the lower input circuit of flip-flop 124 to turn OFF the current source 144. Thus for the above assumed conditions the fifth to eighth interrogations have determined whether the analog input has a value less than 1, or a value at least 1 but less than 2, and have produced a corresponding pulse pattern on the current-code line 100. These pulse patterns, as well as others to be described, are shown in Table III later discussed.

If when the current source 144 is turned ON and one of the input circuits of AND gate 111 is activated, and with all of the other current sources, except source 139, OFF because it has been determined by previous interrogations that the analog input being measured is of value greater than 2 but less than 4, the current on line 130 is supplied by sources 139 and 144 and accordingly has a value of 3. If the analog being measured has a value of at least 3, the resulting output level of comparison amplifier 131, as applied to the second input circuit of AND gate 111, is insufficient to permit opening of this gate so that when the eighth interrogation pulse is applied to its third input circuit, the AND gate 111 remains closed and produces no output pulse. In this case, the flip-flop 124 is left ON and source 144 continues to supply current to Current Sum line 130.

If, on the other hand, the analog input has a value less than 3, the resulting output level on line 133 from the comparison amplifier 131 to the second input circuit of AND gate 111 is sufficient to insure opening of this gate when the eighth interrogation pulse is applied to its third circuit. In such case, and as above described, the resulting output pulse of AND gate 111 turns OFF the current source 144 and causes a current-code pulse to be applied to the line 100. Thus, for these conditions the fifth to eighth interrogations have determined whether the analog input has a value greater than 2 but less than 3, or a value at least 3 but less than 4, and has produced a corresponding pulse pattern shown in subsequent Table III.

If when the current source 144 is turned ON and one of the input circuits of AND gate 111 is activated and all of the other current sources, except source 126, are OFF because it has been determined by previous interrogations that the analog input being measured is greater than 4 but less than 6, the current ON line 130 is supplied by sources 126 and 144 and has a value of 5. If the analog input being measured has a value of at least 5, the resulting output level of comparison amplifier 131, as applied to the second input circuit of AND gate 111, is insufficient to permit opening of this gate, so that when the eighth interrogation pulse is applied to its third input circuit, this gate remains closed. In this case, the flip-flop 124 is left ON and source 144 continues to supply current to the Current Sum line 130.

If, on the other hand, the analog input has a value less than 5, the resulting level at the second input circuit of AND gate 111 is sufficient to permit opening of this gate. Thus, when the eighth interrogation pulse is applied to the third input circuit of AND gate 111, an output pulse is produced. As previously described, this output pulse is effective to turn OFF the current source 144 and to cause a current-code pulse to be applied to the line 100. Thus, for this assumed condition the fifth to eighth interrogations have determined whether the analog input has a value greater than 4 but less than 5, or a value at least 5 but less than 6, and has produced a corresponding pulse pattern included in those shown in subsequent Table III.

If when the current source 144 is turned ON and one of the input circuits of AND gate 111 is activated and only the current source 137 is OFF because it has been determined by previous interrogation that the analog input under measurement is greater than 6 but less than 8, the current on line 130 is supplied by the sources 126, 139 and 144 and accordingly has a value of 7. If the analog input has a value of at least 7, the resulting output level of comparison amplifier 131 at the second input circuit of AND gate 111 is insufficient to permit opening of this gate. Consequently, when the eighth interrogation pulse is applied to its third input circuit, the AND gate 111 remains closed. In this case, the flip-flop 124 is left ON and source 144 continues to supply current to line 130.

If, on the other hand, the analog input has a value less than 7, the resulting level at the second input circuit of AND gate 111 is sufficient to permit opening of this gate. Consequently, when the eighth interrogation pulse is applied to its input circuit, the AND gate 111 produces an output pulse. As previously explained, this output pulse is effective to turn OFF the current source 144 and to cause a code pulse to be applied through OR gate 99 to the current-code line 100. Thus, for this assumed condition the fifth to eighth interrogations have determined whether the analog input has a value greater than 6 but less than 7, or a value at least 7 but less than 8, and have produced a corresponding pulse pattern including those shown in Table III.

If when the current source 144 is turned ON, and one of the input circuits of AND gate 111 is activated and none of the other current sources 126, 137, 139 is OFF because of the determination by previous interrogations that the analog input being measured is at least 8, the current supplied on line 130 is by all four sources and has a value of 9. If the analog input has a value of at least 9, the resulting level at the second input circuit of AND gate 111 is insufficient to permit opening of this gate. Thus, when the eighth interrogation pulse is applied to its third input circuit, the AND gate remains closed. In this case, the flip-flop 124 is left ON and the source 144 continues to supply current to line 130.

If, on the other hand, the analog input has a value less than 9, the resulting output level of the comparison amplifier 131, as applied over line 133 to the second input circuit of AND gate 111, is sufficient for opening of the gate. Thus, when the eighth interrogation pulse is applied to its third input circuit, the AND gate 111 produces an output pulse. As previously explained, this output pulse is effective to turn OFF the current source 144 and to cause a code pulse to be applied to the current-code line 100. Thus, for this assumed condition the fifth to eighth interrogations have determined whether the analog input has a value less than 9, or a value of at least 9, and have produced a corresponding pulse pattern included in Table III.

As appears from the foregoing, any one or more of the current sources 126, 137, 139 and 144 may be left ON after the eighth interrogation. To insure that all of these current sources are OFF before encoding of the output of the next condition-responsive device 11, a Reset B pulse is applied over line 146 to all of the OR gates 135, 140, 142 and 145.

In the particular system described, the coding is of binary-decimal type in which four pulse positions respectively have values of 4, 2, 2 and 1. Other binary-decimal codes, such as 5, 2, 2, 1, 4, 3, 1, 1, and 3, 3, 2, 1 may be used. All of them, however, also have a repeating digit so that a lock-out such as above described should be used to provide unique code representation of all values. It is also possible to use the regular binary progression coding in whics four-pulse positions have values of 8, 4, 2, 1. This code may be used to extend the capability of the four-pulse group to identification for sixteen stations and analog values from 0 to 15; or conversely, the possible states 10, 11, 12, 13, 14 and 15 must be locked out if a binary-decimal code is used.

The coding of Table II previously shown and Table III shown below is of the binary-decimal progression type.

*Table III*

| Analog Value | Interrogation 5th, 6th, 7th, 8th, Current Code (line 100) | | | |
|---|---|---|---|---|
| 0 | X | X | X | X |
| 1 | X | X | X |   |
| 2 | X | X |   | X |
| 3 | X |   | X | X |
| 4 |   | X | X | X |
| 5 | X | X |   |   |
| 6 |   | X | X |   |
| 7 |   |   | X | X |
| 8 |   |   |   | X |
| 9 | None | | | |

From the preceding discussion of FIG. 4B, it will be understood that the fifth to eighth interrogations produce on the current code line 100 one of the pulse patterns shown in Table III, the particular pattern produced depending upon the analog value being encoded. It will be noted in this coding, similar to the one shown in Table II for station identification, that the number of pulses varies from zero to four; that three pulses may represent 1, 2 or 4; that two pulses may represent 3, 5 or 6; and that one pulse may represent 7 or 8. In the decoding of patterns such as shown in Tables II and III, it is necessary to additionally provide periodic clock pulses for unambiguous interpretation of such code groups. Such periodic clock pulses could be supplied over an additional transmission channel including an additional recording head in the initial recording of the station identification and data pulses; and could also be supplied over an additional transmission channel and playback head when the tape is played back for analysis of the record.

In accordance with one aspect of the present invention, such need for an additional transmission channel is obviated by converting the identification and data codes shown in Tables II and III to a code in which each decimal digit of the station identification and of the data information is represented by a fixed number of pulses. An arrangement for effecting such conversion and for also producing the timing pulses, the interrogation pulses and the Reset B pulses is shown in FIG. 4A and is now described.

As mentioned in discussion of FIG. 3, the Scan Switch 10 produces an Initiate pulse each time it is advanced for encoding of the output of the next station. In discussion of FIG. 4B, it has been explained how each Initiate pulse as transmitted over line 45 to the station-identification storage register 50 is used to advance the station number stored in that register. In discussion of FIG. 4B, it has also been explained how each Initiate pulse as transmitted over line 45A, is used to start the digit selection ring-counter involving the flip-flops 74 to 71 and 91 to 94.

Each Initiate pulse, as applied to line 45B (FIG. 4A), is also effective to start a pulse generator 150 which produces the timing and interrogation pulses discussed in connection with FIG. 4B. Specificaly, each Initiate pulse turns ON the flip-flop 151 after a delay of say 175 microseconds afforded by delay device 152. The resulting rise in level of the output of flip-flop 151 as applied to differentiator 153 produces a pulse which is passed by OR gate 154, and after a delay of say 200 microseconds introduced by delay device 155 is impressed on the interrogation line 60 as the first interrogation pulse (FIG. 6). In the particular system being described, the sum of the delays provided by devices 152, 155 is 375 microseconds. Thus, this is the interval between each Initiate pulse and the first interrogation pulse of the following series. After a delay of say 25 microseconds introduced by delay device 156, this first interrogation pulse appears on line 79 as the first timing pulse (FIG. 6). The first interrogation pulse is also applied through delay device 157 to an input circuit of the AND gate 158. Since the other input circuit of AND gate 158 is still at the ONE output level of flip-flop 151, its output pulse is passed by OR gate 154. After a delay introduced by delay device 155, this output pulse appears on line 60 (FIGS. 4A and 4B) as the second interrogation pulse and after the delay afforded by device 156 appears on line 79 (FIGS. 4A, 4B) as the second timing pulse. This re-cycling of a pulse through the loop including the delay devices 155 and 157, AND gate 158 and OR gate 154 continues until the required number of interrogation and timing pulses have been produced. In the particular system described, the sum of the delays provided by devices 155 and 157 is 400 microseconds, so that the interrogation pulses are at 400 microsecond intervals and the timing pulses are at 400 microsecond intervals, with the latter each 25 microseconds later than the corresponding interrogation pulse (FIG. 6).

When the last flip-flop 94 of the data digital selector 90 (FIG. 4B) is turned OFF, as previously described, the drop of its output level as appearing on the TURN-OFF 159 (FIGS. 4A–4B) is effective through differentiator 160 to turn OFF the flip-flop 151 so that no more timing or interrogation pulses are produced until the next Initiate signal is applied to the pulse generator 150. The drop in output level on TURN-OFF line 159 is also effective as applied to the differentiator 162 after an interval of 100 microseconds introduced by delay device 161 to produce the Reset B pulse (FIG. 6). As previously described, the Reset B pulse is applied over line 42 to the Scan Switch 10 to advance the ring-counter 39 by one step and over line 146 to the OR gates 135, 140, 142 and 145 of FIG. 4B to turn OFF all of the current sources left ON by the previous encoding operation.

As previously described, the timing pulses produced by generator 150 are used to control the sequential operation of the digital selectors of FIG. 4B. They are also used as now described by the code converter 80 (FIG.

4A) which converts the pulse pattern of each of Tables II and III to the pulse patterns of FIG. 6A which, unlike those of Tables II and III, all have the same number of pulses.

Each timing pulse is applied over line 79A (FIG. 4A) to one input circuit of flip-flop 165 to produce an output level passed by the OR gate 166 to the Coder Output line 167 (FIGS. 1 and 4A). Each timing pulse is also applied to the delay device 168 connected through OR gate 169 to the other input circuit of flip-flop 165. The delay device 168 delays the timing pulse for about 200 microseconds. Thus, unless the flip-flip 165 is turned OFF before elapse of that interval, the delayed timing pulse then turns it OFF. Consequently in such case the level on the Code Output line 167 then drops, completing the formation of a wide pulse having a duration of 200 microseconds. However, and as now described, the flip-flop 165 may be turned OFF before lapse of the 200-microsecond interval to produce a narrower pulse on the Code Output line 167.

Each timing pulse is also directly applied to one input circuit of the AND gate 170. If when the timing pulse is applied to AND gate 170 its other input circuit is enabled by the output level of flip-flop 171, the AND gate 170 produces an output pulse. The output level of flip-flop 171 is normally ONE. The output pulse of AND gate 170, after a delay of about 100 microseconds provided by the delay device 168A, is passed by the OR gate 169 to turn OFF the flip-flop 165. Thereupon the level of the Code Output line 167 drops to its original value, completing the formation of a narrow pulse of 100 microsecond duration on that line.

Whether the output pulse formed by code converter 80 in the interval between successive timing pulses is a wide output or a narrow output pulse depends upon whether or not the intervening interrogation has resulted in the appearance of a pulse on either the identification-code line 90 or the current-code line 100 (FIGS. 4A, 4B). These code lines extend to the input circuits of OR gate 172. The output circuit of this OR gate is connected directly to one input circuit of flip-flop 171 and is connected to the other input circuit thereof through the delay device 173 which introduces a delay of about 60 microseconds. Consequently whenever no pulse appears on either of lines 90 or 100 after an interrogation, the flip-flop 171 applies its normal output level of ONE to one input circuit of AND gate 170 so that, as above described, a narrow pulse is produced on Coder Output line 167. If, however, a pulse appears on one or the other of lines 90, 100 after an interrogation, it first turns the flip-flop 171 OFF and then after a 60 microsecond interval turns it back ON. This interval spans the time of application of the next timing pulse to the other input circuit of AND gate 170 and so prevents that pulse from turning OFF the flip-flop 165 through the path including the 100 microsecond delay device 168A. Thus, the flip-flop 165 is not turned OFF until after 200-microsecond delay provided by device 168. Thus, the output pulse produced on Coder Output line 167 is a wide one.

To give a specific example of the changed character of the coding, it will be assumed that the sampled output of measuring station #2 has an analog value of 5. The first four interrogations result in the appearance of three pulses on the line 90 (see line 2 of Table II), but on the encoder output line 167 there appear four pulses having the time-pulse-width pattern shown in line 2 of FIG. 6A. The following four interrogations result in the appearance on line 100 of two pulses (see line 6 of Table III), but on the encoder output line there appear four pulses having the time-pulse-width pattern shown on line 5 of FIG. 6A. The encoder output for the eight interrogations is therefore 8 pulses: the first four having a pulse-width pattern coded uniquely to identify the station as station #2, and the second four having a pulse-width pattern coded uniquely to represent the value 5 as the measured output of that station.

For decoding of the stream of output pulses from the encoder and for decoding of the stream of output pulses from the tape recorder 14 (FIG. 1) during playback, it is necessary that some provision be made to enable identification of eight successive pulses as being a group related to a particular station and the data therefrom. In the preferred arrangement shown, this is accomplished by using each Initiate signal to produce on the encoder output line 167 a preliminary or START pulse whose duration is different from the two pulse widths used for coding of the station identification and data pulses.

Specifically, the Initiate pulse is applied over line 45C directly to one input circuit of the flip-flop 174, whereupon its resulting output level of ONE is applied through OR gate 166 to the encoder output line 167. The Initiate pulse is also applied, after a delay of say 300 microseconds afforded by delay device 175, to the other input circuit of flip-flop 174 to reduce the level on encoder output line 167 to its original value. There is thus completed the formation of a START pulse whose width is substantially different from the immediately following eight pulses. Thus, for each position of the Scan Switch 10, the encoder output consists of nine pulses; the first of which is a 300 microsecond pulse, indicating that the following eight pulses all belong to the same composite group of which the first four are station-identification pulses, and the second four are data pulses related to the output of that station.

The time relationships between the START signal, the interrogation pulses, the timing pulses, the output pulses of the encoder, and various other levels and pulses discussed in connection with FIGS. 4A and 4B are shown in FIG. 6, which serves as a résumé of much of the preceding explanation.

The current sources 126, 137, 139 and 144, shown in block in FIG. 4B, are each preferably of the type shown more fully in FIG. 5. Each of them comprises two resistors 180, 181 connected in series between the upper output circuit of the associated flip-flop and the Current Sum line 130. The common terminal 182 of these resistors is connected to the common terminal 183 of the diodes 184, 185 connected in series between the terminals 186, 187 of a stabilized voltage source common to all of the four current sources. The diodes are so poled that no current flows through them directly from one to the other of the supply terminals 186, 187. By way of specific example, the potentials of the supply terminals 186, 187 may be respectively −49.6 volts and −.4 volt with respect to ground when the diodes used have a voltage drop of .4 volt during conduction. When the associated flip-flop is OFF, the potential of its upper output terminal 189 is 25 volts positive with respect to ground; when the flip-flop is ON, the potential of its terminal 189 is 75 volts negative with respect to ground.

The resistor 180 is of such value that when the flip-flop is OFF, the current flowing through it from the output terminal 189 to diode 184, and thence to terminal 187 of the voltage source, is of magnitude bringing the potential of terminal 182 to zero with respect to ground. Hence, no current flows from the current source through resistor 181 to the Current Sum line 130. When the flip-flop is ON, current flows from terminal 186 of voltage source 188 through the diode 185 to terminal 182, now 50 volts negative with respect to ground. Part of this current flows through resistor 180 to the flip-flop terminal 189, and the remainder flows through resistor 181 to the Current Sum line 130. The particular value of resistor 181 in each of the four current sources 126, 137, 139, 144 determines the magnitude of the current supplied to line 130 and is selected in accordance with the coding used. In the particular arrangement above described, the value of these standard resistors is such that the currents from the sources 126, 137, 139 and 144 respectively have the values of 4, 2, 2 and 1. This completes the description of the encoder shown in FIGS. 4A and 4B and suited for use as encoder 12 of FIG. 1.

A selector suited for use with this encoder to serve the earlier described purposes of the selector 16 of FIG. 1 is shown in FIG. 7 and now described in detail.

The stream of identification and data pulse groups appearing on output line 167 of the encoder during the original recording, or as appearing on output line 262 of the tape recorder 14 during playback, is applied to the input terminal 190 (FIG. 7) of the selector. The dial 22 of the selector is set to correspond with the station from which the data information is desired and, in the preferred manner later described, sets up in the series of selector gates 200A, 200B a pulse acceptance pattern corresponding with the pulse identification coding of the selected station. Upon coincidence of a group of received identification pulses with the preset pattern of the selector, there is produced a coincidence signal on line 191 which opens a gating means including the flip-flop 192. The opening of this gate effectively permits the immediately following data pulses to appear on the selector output line 193 for display of the data information in binary decimal coded form on the cathode ray tube 18 of FIG. 1, or equivalent device. Such coincidence signal may also effect opening of output gating means including the AND gates 194–197 for a decimal display of the selector data information by the indicator 19 of FIG. 1 or equivalent.

The flip-flops 201, 202 jointly effectively measure the duration of each of the successive incoming pulses applied to input terminal 190 to produce an output pulse on line 203 if the incoming pulse is a narrow one, or to produce an output pulse on line 204 if the incoming pulse is a wide one. More specifically, the leading edge of each incoming pulse as applied to differentiator 205 produces an output pulse which, as applied to the upper input circuit of flip-flop 201, is effective to turn it on and establish a ONE level on one of the input circuits of AND gate 206. The differentiator output pulse is also applied, after a delay of 150 microseconds introduced by delay device 207, to the other input circuit of flip-flop 201 to turn it OFF. If, while the flip-flop 201 is still ON, the other input circuit of AND gate 206 is activated by the output pulse on line 235 from differentiator 205, such pulse occurring when the first incoming pulse terminates, the AND gate 206 produces a pulse on line 203.

If, on the other hand, no output pulse is received from differentiator 205 within the 150-microsecond interval in which flip-flop 201 is turned ON, no output pulse from AND gate 206 can appear on line 203. However, the turning OFF of the flip-flop 201 produces an output pulse directly applied to the upper input circuit of flip-flop 202 to turn it ON and is also applied after an interval of 100 microseconds introduced by the delay device 209 to the lower input circuit of flip-flop 202 to turn it OFF. During that interval, one input circuit of the AND gate 210 is activated by the ONE output level of flip-flop 202.

If during that interval of 100 microseconds from the TURN-ON of flip-flop 202 the other input circuit of AND gate 210 receives a pulse from the differentiator 205, this gate produces an output pulse on line 204. Thus, if the duration of the incoming pulse on selector input terminal 190 is greater than 150 microseconds but not greater than 250 microseconds, a pulse is produced on line 204. If the duration of the incoming pulse to selector input termnial 190 is greater than 250 microseconds, the flip-flop 202 is turned OFF as above described without production of a pulse by AND gate 210.

The drop in output level resulting from turning OFF of flip-flop 202 causes the differentiator 211 to produce an output pulse which is applied to the upper input circuit of flip-flop 213 to apply an output level of ONE to one input circuit of AND gate 214. Since a START pulse has a duration greater than 250 microseconds, this input circuit of AND gate 214 is activated when its other input circuit receives from differentiator 205 an output pulse produced by termination of a START pulse. Thus, the AND gate 214 produces an output pulse which as applied to the upper input circuit of flip-flop 212 turns it ON. The flip-flop 212 remains in the ON state until its lower input circuit receives a pulse from line 221, i.e., when the leading edge of the next incoming signal is impressed on differentiator 205. When turned OFF, the drop in output level of flip-flop 212 is converted by differentiator 222 to a pulse applied to the first of the selector stages 200A–200D to begin the checking of the subsequent four pulses to determine whether or not they comply with the identification pattern preset by the selector dial 22. The output pulse of differentiator 211 is also applied directly to the upper input circuit of flip-flop 215 to turn it ON and is applied, after a delay of 200 microseconds introduced by the delay device 216, to the lower input circuit of flip-flop 215 to turn it OFF. The resulting drop in level of the output of flip-flop 215 results in the production of an output pulse by differentiator 217. This pulse is applied to one input circuit of AND gate 218 whose other input circuit at that time is at the ONE output level established by flip-flop 213 only if that flip-flop has not been turned OFF by the leading edge of a following pulse. This condition will exist at the end of each sequence of nine pulses when a gap then appears. Under these input circuit conditions, the AND gate 218 produces an output pulse transmitted by line 219 to the lower input circuit of flip-flop 220 so that, as later described, the flip-flop 220 will produce a coincidence signal when, and only when, the serially received identification pulses correspond with the acceptance pattern established by selector dial 22.

It is to be noted that to accommodate the selector to the longer durations of the incoming pulses occurring during playback, the time delays of devices 207, 209, 216 are increased by a factor corresponding with the ratio of the recordinging-to-playback speeds of recorder 14. In the particular system described, the factor is 65.

The selector stages 200A–200D are similar in composition so that only one of them need be described in detail. The corresponding elements of the various stages are identified by the same reference character plus a letter identifying the particular stage.

Referring, for example, to stage 200A, it includes the flip-flops 223A, 224A, two AND gates 225A, 226A, an OR gate 227A, and two delay devices 228A, 229A affording a nominal delay of a microsecond or so.

One input circuit of each of the upper AND gates 225A–225D of stages 200A–200D is at one or the other of two levels defining a pattern corresponding with the setting of dial 22. With the selector switch set by dial 22 to a position corresponding with any of stations 4 to 9 inclusive, the level applied from source 232 through OR gate 231A to the uppermost input circuit of AND gate 225A inhibits its transmission of whatever signals may be applied to its other three input circuits. With the selector switch 230 set to a position corresponding with any of stations 2, 3, 6, 7, 8 or 9, the level applied through OR gates 231B to the uppermost input circuit of AND gate 225B similarly inhibits its transmission regardless of what signals are applied to its other input circuits. With the selector switch 230 set to a position corresponding with either of stations 8 or 9, the level applied through OR gate 231C similarly inhibits AND gate 225C (not shown) of selector stage 200C. With the selector switch 230 set to a position corresponding with any of stations 1, 3, 5, 7 or 9, the level applied through OR gate 231D similarly inhibits AND gate 225D (not shown) of selector stage 200D.

One input circuit of each of the lower AND gates 226A–226D is also at one or the other of two levels depending upon the setting of the selector switch 230. As apparent from the symbols used in FIG. 7, when any of the OR gates 231A–231D passes a level inhibiting the closure of the upper gate of any one or more of stages 200A–200D, the lower gate of the same stage or stages is activated by that level. Thus, as will later more clearly appear, the upper and lower gates of each stage provide alternate paths through that stage provided that the duration pattern of the serially-received pulses conform in duration with the acceptance pattern preset by the selector switch 230.

It will be assumed for purpose of explanation of the operation of selector stages 200A–200D that it is desired to segregate from the incoming stream of pulses the data pulses of station #4. For the corresponding setting of switch 230, an inhibiting level is applied through OR gate 231A to the uppermost input circuit of upper AND gate 225A and an activating level is applied to the uppermost input circuit of the lower AND gate 226A. As will be recalled from discussion of FIG. 6, the pulse group identifying station #4 is a first narrow pulse and three succeeding wide pulses.

The leading edge of the first incoming pulse following the START pulse is effective through the flip-flop 212 and differentiator 222 to turn ON the flip-flop 223A and apply an output level of ONE to a second input circuit of AND gate 225A. This level is maintained for 400 microseconds at which time the leading edge of the second identification pulse, as effectively applied over line 221 to the lower input terminal of flip-flop 223A, turns it OFF. During this interval, a pulse is produced on one or the other of lines 203, 204 as above described depending upon whether the first identification pulse is a narrow one or a wide one. If the first identification pulse is a wide one, the resulting pulse on line 204 as applied to the upper input circuit of flip-flop 224A establishes a ONE level on the lowermost input circuit of AND gate 226A so that this gate is inhibited from producing an output when the leading edge of the second identification pulse produces on line 221 a pulse which is applied to the second lowermost input circuit of that gate. The upper AND gate 225A is also precluded from producing an output pulse because inhibited by the level applied to its uppermost input circuit from the selector switch 230. Thus, if the first identification pulse is a wide one, neither of the AND gates 225A, 226A of the first selector stage 200A produces an output signal and all further identificaiton and data pulses impressed on the input terminal 190 are effectively rejected or ignored by the selector until the next START signal is received.

If, however, the first identification signal is a narrow one and so meets the first pulse requirement of the pattern established by switch 230, the leading edge of the first identification pulse results in production of a pulse on line 203 by the AND gate 206. This pulse as applied to the lower input circuit of the flip-flop 224A establishes a zero level on the lowermost input circuit of AND gate 226A so that this gate is not inhibited. The two upper input circuits of this gate are respectively activated by the levels from OR gate 231A and the flip-flop 223A. Thus, AND gate 226A is effective to produce an output pulse when the leading edge of the second identification pulse produces on line 221 a pulse which is applied to the next lower input circuit of AND gate 226A.

The resulting output pulse of AND gate 226A is passed by OR gate 227A to the upper input circuit of flip-flop 223B to the second stage of the selector.

In the same manner as above described, the second stage determines whether the second incoming identification pulse matches the acceptance pattern established by the setting of switch 230. Thus, in the case assumed, if the second identification pulse is a narrow one, the stage 200B produces no output pulse and the selector ignores all further incoming pulses on its input terminal until the START is received. If, however, the second pulse is a wide one, so meeting the preset acceptance pattern, the upper AND gate 225B produces an output pulse when the leading edge of the third identification pulse produces a pulse on line 221. In this case, the lower AND gate 226B is inhibited by the ONE output level of flip-flop 224B but the upper AND gate 225B is not inhibited by any level from OR gate 231B. In like manner, the third stage 200C determines whether the third identification pulse meets the acceptance requirement of that stage, and if so, produces an output pulse which conditions the fourth stage 200D to determine whether the fourth identification pulse meets the acceptance requirement of that stage.

If the four successive identification pulses are respectively accepted by the stages 200A–200D, the output pulse of the last stage 200D turns ON the flip-flop 220 to produce a coincidence signal level on line 191. This level is maintained until the TURN-OFF signal produced on line 219, as previously described, is applied to the lower input circuit of flip-flop 220.

Each of the successive START pulses again begins a comparison of the identification code pattern of the immediately following pulses and the process of selection continues. Each time the group of identification signals corresponding with the selected station sequentially appears, the coincidence detector 220 becomes effective as now described to pass through the selector the data pulses which are representative of the output of the condition-responsive device at the selected station. The coincidence level on line 191 is applied to one input circuit of AND gate 233 whose other input circuit receives the pulses occurring on line 221 each time the leading edge of an incoming pulse results in an output pulse on the upper output circuit of differentiator 205. The AND gate 233, however, produces no output pulses unless its upper input circuit is activated by the coincidence level output on line 191. The leading edge of the first data pulse produces the differentiator output pulse capable of establishing the coincidence level; the same differentiator output pulse is applied to the lower input circuit of AND gate 233; preferably after a nominal delay afforded by delay device 261 to insure concurrence of the coincidence level and the pulse from differentiator 205.

With AND gate 233 so activated, the next pulse from delay 261 is passed to the upper input circuit of flip-flop 192 to turn it ON and establish a ONE level on the output line 193 of the selector. The next pulse on line 235 from the lower output circuit of differentiator 205 is applied through delay 263 equal to delay 261 to the lower input circuit of flip-flop 192 and so turns it OFF. Thus, the first data pulse of the selected station is reproduced on the serial output line 193 of the selector. The duration of the reproduced pulse corresponds with the width of the first data pulse so that it is a replica of it as displayed by the cathode-ray tube 18 (FIG. 1) fed from line 193.

In like manner, each of the remaining data pulses is in succession reproduced on output line 193 and applied to the tube 18. Thus, the output data of the selected station repeatedly appears on the face of tube 18 as a group of binary coded pulses representing the analog value of the measured condition at that station. Because of the high repetition rate, even at the lower playback speed, the cathode ray display continuously appears as a complete group of pulses in fixed position but whose individual widths vary, in accordance with the coding of FIG. 6A, when the value of the measured condition changes.

To produce a decimal presentation of the selected data information, there is provided a Shift Register 260 including a group of flip-flops 236–239 whose output levels are respectively applied to one of the input circuits of the AND gates 194–197. For brevity, these input terminals will be called the register input terminals. To the other input circuit of all these AND gates is applied the level on READ line 241, i.e., the lower output circuit of the Coincidence flip-flop 220.

Which one of the ten AND gates 240A–240J produces an output level on one of the zero to nine output lines of the selector when a READ level appears on line 241, depends upon the levels then existing upon the register input circuit of each of the AND gates 194–197. The required patterns of state of the four AND gates 194–197, to determine on which output line an output will appear, as shown in Table IV below.

*Table IV*

| Decimal Gate | AND GATES | | | |
|---|---|---|---|---|
| | 194 | 195 | 196 | 197 |
| 0 | ON | ON | ON | ON |
| 1 | OFF | ON | ON | ON |
| 2 | ON | ON | OFF | ON |
| 3 | OFF | ON | OFF | ON |
| 4 | ON | ON | ON | OFF |
| 5 | OFF | ON | ON | OFF |
| 6 | ON | ON | OFF | OFF |
| 7 | OFF | ON | OFF | OFF |
| 8 | ON | OFF | OFF | OFF |
| 9 | OFF | OFF | OFF | OFF |

For example, to produce a decimal display of the value 4, three of the input circuits of AND gate 240E must be activated by a ONE level from the AND gates 194, 195, 196, and the fourth input circuit of AND gate 240E must not be inhibited by a ONE level from AND gate 197.

When the coincidence level existing on one input circuit of AND gate 233, it produces an output pulse each time the leading edge of an incoming data pulse is differentiated by differentiator 205. Such output pulse of AND gate 233 is applied over line 250 to the upper input circuits of flip-flops 236–239 to establish a zero level on the register input circuit of each of the AND gates 194–197.

Each output pulse of AND gate 233 is also applied directly to the upper input circuit of flip-flop 242 to turn it ON and is applied, after an interval of 100 microseconds afforded by delay device 243, to the lower input circuit of flip-flop 242 to turn it OFF.

The differentiator 244 in response to the resulting drop of its input level 100 microseconds after a pulse on line 250 produces an output pulse which is applied over line 245 to the upper input circuits of flip-flops 246–248 to set their outputs to Zero level. This pulse, for reasons which will later appear, is called the Shift pulse.

The aforesaid pulses appear on lines 245 and 250 for every data pulse pertaining to the selected station whether it be wide or narrow. If the data pulse is a narrow one, its termination has no further effect upon the state of the flip-flops 246–248 or 236–239. It is important to note that when the incoming data pulse is a narrow one, a ZERO level has been established on the register input of AND gate 194. When, however, the data pulse is a wide one, the AND gate 210 produces an output pulse as previously described in connection with the selector gates 200A–200D. This output pulse of AND gate 210 is applied by line 204A to one input circuit of AND gate 254 whose other input circuit is activated by the coincidence level existent on line 191. The data pulse of AND gate 254 is applied to the lower input circuit of flip-flop 236 and turns it ON to establish a ONE level on the register input circuit of AND gate 194.

From the foregoing it will be appreciated that if the first data pulse is a wide one, the level established on the register input circuit of AND gate 194 is a ONE, whereas if the first data pulse is a narrow one, the level there established is a ZERO. For reasons which later appear, the levels on AND gates 195–197 at the end of the first pulse are not significant. As will be explained, the level established on AND gate 194 by the first data pulse will be in effect progressively shifted to AND gates 195 and 196 and ultimately to AND gate 197 by the application of the subsequent Shift pulses.

In manner above described, it is determined whether each of the second, third and fourth data pulse is a wide one or narrow one, and in each the level of gate 194 is set accordingly. The second level setting of gate 194 is effectively stepped by the next two shift pulses to gate 196: the third level setting of gate 194 is effectively stepped by the last shift pulse to gate 195: the fourth level setting of gate 194 remains thereon. Thus, when the READ signal level is applied by line 241 to the other input circuit of AND gates 194–197, there then exist levels corresponding with the sequentially received data pulses which produce an output level on one of the ten output lines zero to nine, as previously described.

There remains to be described how the shift signals effectively advance the levels sequentially established on AND gate 194 to one or more of the following gates. For that purpose, it will be assumed that in the sequence received the first and third data pulses are wide and the second and fourth data pulses are narrow. This corresponds with a value of 3 (FIG. 6A).

Since the first data pulse is a wide one, the register input of AND gate 194 is left with a ONE level, as above described. As was not previously mentioned, when the lower output circuit of flip-flop 236 rose to such level, the differentiator 255 responded, after a nominal delay of 1 microsecond (delay device 258A), by applying a pulse to the lower input circuit of flip-flop 246 so that its output level became ONE if it was not already at that level. Since the differentiator 251 does not respond, this ONE input level of AND gate 194 is effectively stored in the Shift flip-flop 246.

The pulse produced on line 250 at the leading edge of the second data pulse as applied to the upper input circuit of flip-flop 236 turns it OFF. Since the second data pulse is a narrow one, flip-flop 236 remains in the OFF state until the next wide pulse is received.

The second Shift pulse on line 245, as applied to the upper input circuit of flip-flop 246, turns it OFF, and differentiator 251 responds to the drop of its input level. The resulting output pulse of differentiator 251 is applied to the lower input circuit of flip-flop 237 to establish a ONE output level thereof. The rise in output level of flip-flop 237 causes the differentiator 256 to produce, after a nominal delay of 1 microsecond (delay device 258), an output pulse applied to the lower input circuit of Shift flip-flop 247 to establish or maintain a ONE output thereof which is effectively stored until the next Shift pulse is applied. This stored ONE may be considered as the original ONE level of AND gate 194. The Zero state of flip-flop 246 just prior to the third pulse on line 250 represents a storage of the existing Zero state on AND gate 194.

The third pulse on line 250 corresponding in time with the leading edge of the third data pulse turns OFF all of the flip-flops 236–239.

The third Shift pulse as applied to flip-flop 246 does not change its output as flip-flop 246 was in the Zero state just prior to the arrival of this pulse. The third Shift pulse applied to flip-flop 247 drops its output level to zero, whereupon the differentiator 252 produces an output pulse applied to the lower input circuit of flip-flop 238. The rise in output of flip-flop 238 results in production by differentiator 257 of an output pulse applied to the lower input circuit of Shift flip-flop 248 to turn it ON.

Thus, the first level of ONE for AND gate 194 is now effectively stored in flip-flop 248 and the second level of ZERO for AND gate 194 is now effectively stored in flip-flop 247.

Since the third data pulse is a wide one, the output pulse of AND gate 254 turns ON the flip-flop 236 to establish a ONE level on the register input circuit of AND gate 194. This rise in level, as previously described, produces a stored ONE in the flip-flop 246.

When the leading edge of the fourth data pulse is applied, the pulse on line 250 temporarily sets all of the register inputs of AND gates 194–197 to ZERO as originally mentioned. When the last Shift pulse appears on line 245, the flip-flop 248 is turned OFF and differentiator 253 produces an output pulse applied to the lower input circuit of flip-flop 239 to turn it ON. Thus, the ONE level established on gate 194 by the first data pulse now appears on the register input of gate 197. The same Shift pulse as applied to the flip-flop 247 leaves it in ZERO state so that the output level of flip-flop 238 remains at ZERO. Thus, the level of ZERO produced on AND gate 194 by the second data pulse now appears as a ZERO level on AND gate 196. The same Shift pulse as applied to flip-flop 246 turns it OFF, whereupon the differentiator 251 produces an output pulse applied to the lower input circuit of flip-flop 237 to turn it ON. Thus, the ON level established on gate 194 by the third data pulse now appears as a ONE level on gate 195.

Since the fourth data pulse is a narrow one, the output level of flip-flop 236 remains at ZERO. Thus, when the READ level is applied by line 241, the register input pattern of these gates is:

| AND Gates | | | |
|---|---|---|---|
| 194 | 195 | 196 | 197 |
| OFF | ON | OFF | ON |

By reference to Table IV, it will be seen that this pattern is the one for which the output gate 240D passes a level corresponding with a decimal display value of 3.

The translator 25 of FIG. 1 may be generally similar to the selector and shift register, shown in FIG. 7 heretofore described, in that the station identification signals establish a coincidence signal applied to a gate to permit the following data pulses to be sequentially entered in a Shift Register for conversion by other gates to, in this case, a code suited for actuating keys of the "Flexowriter" 26. The translator 25 is different in that the selector stages 200A–200D must also serve as a counter since the data from all stations rather than a single one is to be transcribed. Thus, one type of coincidence signal is produced at the end of every group of station identification pulses, and a second type of coincidence signal is produced, once each scan, by the identification signal of the first station. This second type of coincidence signal is effective in providing a carriage return of the Flexowriter, thereby assuring that consecutive measurements of any particular station lie in a single column.

What is claimed is:

1. A system including means for converting successively sampled magnitudes of the output of each of a plurality of condition-responsive devices into binary-coded pulse groups of type in which the two binary values are respectively represented by absence and presence of a pulse, means for producing for each sampled output of said condition-responsive devices binary-coded pulse groups of the aforesaid type for identification of the sampled one of said condition-responsive devices, and code-converter means responsive to the aforesaid binary pulse groups for producing between successive samplings a first group of electrical pulses whose number is the same for all of said devices and the duration of whose individual pulses is of one or the other of two finite values, the duration of the successive pulses of said first group defining a pattern uniquely identifying the device whose output has been sampled and for producing a second group of successive electrical pulses whose number is the same for all output magnitudes of the condition-responsive devices and the duration of whose individual pulses is of one or the other of two finite values, the durations of the successive pulses of said second group defining a pattern uniquely representative of the magnitude of the sampled output.

2. A data-handling system as in claim 1 additionally including a selector upon which is impressed all of the first and second groups of pulses from said code-converter means, which includes means preset selectively to respond to that first group pattern which uniquely identifies a particular one of the condition-responsive devices to produce a coincidence signal, and means controlled by the coincidence signal to produce from the associated second group of pulses an output pulse pattern representing the magnitude of the sampled output of the selected condition-responsive device.

3. A data-handling system including a generator for producing timing pulses, means responsive to said timing pulses for converting analog values to binary-coded pulse groups in which the two binary values are respectively represented by absence and presence of a pulse, and an encoder upon which pulse groups from said converting means and timing pulses from said generator are impressed to produce width-coded pulses forming binary-coded pulse groups in which the binary values of 1 and 0 are respectively represented by pulses of one or the other of two finite widths.

4. A system as in claim 3 which additionally includes counter means responsive to the timing pulses from the timing-pulse generator to effect separation of the binary-coded pulse groups.

5. A system as in claim 4 which additionally includes means for producing initiating signals, each of which starts said timing pulse generator.

6. A data-handling system including a generator for producing timing pulses, means responsive to said timing pulses for producing a sequence of binary-coded pulse groups each containing station identification and measurement data, and in which the binary values are respectively represented by absence and presence of a pulse; and encoder means upon which timing pulses from said generator and pulses of the aforesaid binary-coded pulse groups produced by said responsive means are impressed to produce width-coded pulses forming from each of said groups a fixed number of station-identification pulses in which the binary values of 1 and 0 are respectively represented by pulses of one or another of two finite widths, and a fixed number of measurement data pulses in which the binary values of 1 and 0 are respectively represented by pulses of one or the other of two finite widths.

7. A data-handling system including a generator for producing timing pulses, means responsive to said timing pulses for successively converting analog values to binary-coded pulse groups in which the two binary values are respectively represented by absence and presence of a pulse, an encoder upon which each of said pulse groups from said converting means and timing pulses from said generator are impressed to produce width-coded pulses forming binary-coded pulse groups in which the binary values of 1 and 0 are respectively represented by pulses of one or the other of two finite widths, and means for interrupting said timing pulses from said timing pulse generator to produce an interval between successive width-coded pulse groups.

8. A system as in claim 7 additionally including means connected to said encoder for producing a pulse within said interval, said pulse having a third finite width.

9. A data handling system comprising an encoder and switching means for sequentially sampling the outputs at a plurality of measuring stations and supplying the sampled outputs to said encoder each as an electrical signal of magnitude corresponding with the analog value of the output of the respective station, said switching means producing an Initiate pulse for initiating each sampling operation and said encoder including a pulse generator controlled by said Initiate pulse to produce a series of timing pulses and a series of interrogation pulses, a binary register stepped by each Initiate pulse sequentially to store binary values representative of the successive stations, means including a counter-chain controlled by each Initiate pulse and part of the series of timing pulses and part of the series of interrogation pulses successively to produce pulses of a group whose pattern is determined by the binary values stored in said register and which pattern identifies the corresponding station, and means including a counter-chain controlled by the remaining timing and interrogation pulses to convert the analog value of the magnitude of the sample output to a group of binary coded pulses.

10. A data-handling system comprising means for repeatedly sampling electrical quantities in magnitude representative of the output of at least one condition-responsive device and for producing an initiate pulse for initiating each sampling operation, and encoding means electrically connected to said first-named means and responsive to successive initiate pulses and to the intervening sampled electrical quantity to produce for each sampled electrical quantity a group of successive electrical pulses whose number is the same for all magnitudes of said output and including means providing that the individual duration of each of said pulses is of one or the other of two finite values, the durations of the successive pulses of each group defining a binary-coded pattern representative of the sampled magnitude.

11. A data-handling system including means for converting successively sampled magnitudes of the output of at least one condition-responsive device into an electrical pulse code of the binary-progression type in which different magnitudes of the condition are represented by different pulse groups having different numbers of pulses per group, and means responsive to the successive pulse groups so coded for converting them in turn into a group of successive electrical pulses whose number is the same for all sampled magnitudes and whose individual duration is of one or the other of two finite values, the duration of the successive pulses of each group defining a binary-coded pattern representative of the sampled magnitude.

12. A data-handling system comprising means for producing groups of electrical pulses differing in number per group to convey information in a binary-progression code based on absence and presence of pulses, a recorder, and encoding means connected between said pulse-producing means and said recorder and responsive to said electrical pulse groups so coded for converting them, for recording of their information by said recorder into encoded groups of electrical pulses having a fixed number of pulses per group, the duration of successive pulses of each encoded group having one or the other of two finite values so to reproduce said information in a binary-progression code based on widths of pulses in pulse groups of constant number of pulses per group.

13. A data-handling system comprising a scan switch repeatedly sequentially sampling the electrical outputs of a plurality of condition-responsive devices and producing an initiate pulse for initiating each sampling operation, and encoding means controlled by the initiate pulses from said scan switch and effective in the interval between each two successive initiate pulses to convert the sampled electrical output of the corresponding condition-responsive device into a group of successive electrical pulses whose number is the same for all magnitudes of said output and whose individual duration is of one or the other of two finite values to definie a binary-coded pattern representative of the magnitude of said output.

References Cited in the file of this patent

UNITED STATES PATENTS

| | | |
|---|---|---|
| 2,344,254 | Leathers | Mar. 14, 1944 |
| 2,546,316 | Peterson | Mar. 27, 1951 |
| 2,579,852 | Olson | Dec. 25, 1951 |
| 2,606,808 | Brown | Aug. 12, 1952 |
| 2,621,250 | Spencer | Dec. 9, 1952 |
| 2,660,618 | Aigrain | Nov. 24, 1953 |
| 2,680,240 | Greenfield | June 1, 1954 |
| 2,689,950 | Bayliss | Sept. 21, 1954 |
| 2,719,284 | Roberts et al. | Sept. 27, 1955 |
| 2,722,660 | Jones | Nov. 1, 1955 |
| 2,733,431 | Steele | Jan. 31, 1956 |
| 2,771,596 | Bellamy | Nov. 20, 1956 |
| 2,870,429 | Hales | Jan. 20, 1959 |
| 2,884,615 | Garfinkel | Apr. 28, 1959 |
| 2,887,674 | Greene | May 19, 1959 |
| 2,897,486 | Alexander | July 19, 1959 |
| 2,910,684 | Jones | Oct. 27, 1959 |
| 2,953,777 | Gridley | Sept. 20, 1960 |
| 2,975,403 | Doersham | Mar. 14, 1961 |